United States Patent
Maguire

(10) Patent No.: US 9,246,554 B2
(45) Date of Patent: Jan. 26, 2016

(54) USING A WIRELESS RADIO TO MANAGE POWER CONSUMPTION

(71) Applicant: Yael G. Maguire, Boston, MA (US)

(72) Inventor: Yael G. Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 125 days.

(21) Appl. No.: 13/842,156

(22) Filed: Mar. 15, 2013

(65) Prior Publication Data

US 2014/0113561 A1 Apr. 24, 2014

Related U.S. Application Data

(63) Continuation-in-part of application No. 13/118,693, filed on May 31, 2011, now Pat. No. 8,929,806.

(51) Int. Cl.
| | |
|---|---|
| H02J 5/00 | (2006.01) |
| H04B 5/00 | (2006.01) |
| H04W 52/02 | (2009.01) |
| H02J 17/00 | (2006.01) |
| H02J 7/02 | (2006.01) |
| H04M 1/60 | (2006.01) |

(52) U.S. Cl.
CPC .............. *H04B 5/0037* (2013.01); *H02J 5/005* (2013.01); *H02J 7/025* (2013.01); *H02J 17/00* (2013.01); *H04W 52/0261* (2013.01); *H04M 1/6066* (2013.01)

(58) Field of Classification Search
CPC ...................................................... H04B 5/0006
USPC ........................................ 455/41.1, 41.2, 41.3
See application file for complete search history.

(56) References Cited

U.S. PATENT DOCUMENTS

| | | | |
|---|---|---|---|
| 4,020,296 | A | 4/1977 | Dahlquist |
| 5,503,350 | A | 4/1996 | Foote |
| 5,963,012 | A | 10/1999 | Garcia |
| 5,982,139 | A | 11/1999 | Parise |
| 6,114,834 | A | 9/2000 | Parise |
| 6,127,799 | A | 10/2000 | Krishnan |
| 7,383,064 | B2 | 6/2008 | Mickle |
| 7,443,057 | B2 | 10/2008 | Nunally |
| 7,844,306 | B2 | 11/2010 | Shearer |

(Continued)

FOREIGN PATENT DOCUMENTS

| | | |
|---|---|---|
| CN | 102027654 A | 4/2011 |
| JP | 2004-110788 | 4/2004 |

(Continued)

OTHER PUBLICATIONS

International Search Report and Written Opinion for International Application PCT/US2014/024733 Aug. 13, 2014.

(Continued)

*Primary Examiner* — Wen Huang
(74) *Attorney, Agent, or Firm* — Baker Botts L.L.P.

(57) ABSTRACT

Particular embodiments of a wireless communication system comprise a wireless device and a base station having at least one network connection and an RF transceiver. The base station may be configured to generate an RF signal and communicate with the wireless device using backscatter communication. The wireless device may be configured to generate operating power for the wireless device from the RF signal and to receive data transmitted using the RF signal and communicate data to the base station using backscatter communication.

30 Claims, 15 Drawing Sheets

(56) References Cited

U.S. PATENT DOCUMENTS

| | | |
|---|---|---|
| 7,898,215 B2 | 3/2011 | Nagatsuka |
| 8,024,012 B2 | 9/2011 | Clevenger et al. |
| 8,054,037 B2 | 11/2011 | Nagatsuka |
| 8,402,094 B2 | 3/2013 | Bosworth |
| 8,583,190 B1 | 11/2013 | Kopikare |
| 8,644,892 B2 | 2/2014 | Maguire |
| 8,929,806 B2 | 1/2015 | Maguire |
| 2006/0100001 A1 | 5/2006 | Pratt et al. |
| 2006/0238365 A1 | 10/2006 | Vecchione |
| 2007/0123323 A1 | 5/2007 | Zhu |
| 2007/0225831 A1 | 9/2007 | Sakurada |
| 2007/0243851 A1 | 10/2007 | Shoarinejad et al. |
| 2008/0040475 A1* | 2/2008 | Bosworth et al. ............. 709/224 |
| 2008/0048869 A1 | 2/2008 | Wang |
| 2008/0139131 A1 | 6/2008 | Macphail |
| 2008/0261555 A1 | 10/2008 | Chen |
| 2009/0189739 A1 | 7/2009 | Wang |
| 2009/0201134 A1 | 8/2009 | Rofougaran |
| 2009/0312046 A1 | 12/2009 | Clevenger et al. |
| 2010/0142509 A1 | 6/2010 | Zhu et al. |
| 2010/0144392 A1* | 6/2010 | Felt et al. .................. 455/566 |
| 2010/0231407 A1 | 9/2010 | Carr |
| 2010/0291869 A1 | 11/2010 | Wilson |
| 2010/0295663 A1 | 11/2010 | Shoarinejad et al. |
| 2011/0080919 A1 | 4/2011 | Ding |
| 2011/0115432 A1 | 5/2011 | El-Maleh |
| 2011/0177787 A1 | 7/2011 | Hwang |
| 2011/0235627 A1* | 9/2011 | Wang ........................ 370/338 |
| 2011/0244913 A1 | 10/2011 | Kim |
| 2011/0285349 A1 | 11/2011 | Widmer |
| 2012/0052923 A1 | 3/2012 | Park |
| 2012/0166433 A1 | 6/2012 | Tseng |
| 2012/0166532 A1 | 6/2012 | Juan |
| 2012/0309295 A1 | 12/2012 | Maguire |
| 2013/0092730 A1 | 4/2013 | Blinbaum |
| 2013/0303225 A1 | 11/2013 | Maguire |
| 2014/0082046 A1* | 3/2014 | Tal et al. ................... 709/203 |

FOREIGN PATENT DOCUMENTS

| | | |
|---|---|---|
| JP | 2007-199895 | 8/2007 |
| JP | 2009-503716 | 1/2009 |
| KR | 10-2004-0053931 | 6/2004 |
| KR | 10-2004-0107110 | 12/2004 |
| KR | 10-2010-0060168 A | 6/2010 |
| WO | 2007-095267 A2 | 8/2007 |
| WO | WO 2007-095267 A2 | 8/2007 |
| WO | 2010/110618 A2 | 9/2010 |
| WO | 2012/166774 A2 | 12/2012 |
| WO | WO 2014/150999 | 9/2014 |

OTHER PUBLICATIONS

International Search Report and Written Opinion for International Application PCT/US2012/039951, Jan. 17, 2013.
Non-Final Office Action for U.S. Appl. No. 13/118,693, Feb. 4, 2014.
Final Office Action for U.S. Appl. No. 13/118,693, Jul. 30, 2014.
Supplementary European Search Report and European Search Opinion for European Patent Application No. 12792895.0, Nov. 14, 2014.
Response to Non-Final Office Action for U.S Appl. No. 13/118,693, May 29, 2014.
Non-Final Office Action for U.S. Appl. No. 13/118,700, Apr. 10, 2013.
Response to Non-Final Office Action for U.S. Appl. No. 13/118,700, Jul. 10, 2013.
Response to Final Office Action for U.S. Appl. No. 13/118,693, Sep. 16, 2014.
Notice of Allowance for U.S. Appl. No. 13/118,693, Sep. 30, 2014.
Amendment After Notice of Allowance for U.S. Appl. No. 13/118,693, Oct. 15, 2014.
Corrected Notice of Allowance for U.S. Appl. No. 13/118,693, Nov. 20, 2014.
Notice of Allowance for U.S. Appl. No. 13/118,693, Dec. 1, 2014.
Notice of Allowance for U.S. Appl. No. 13/118,700, Oct. 2, 2013.
Non-Final Office Action for U.S. Appl. No. 13/944,660, Feb. 4, 2015.
State Intellectual Property Office of the People's Republic of China's Search Report and Notification of First Office Action (with English translation) for Application No. 201280037635.8, Dec. 18, 2014.
MX Office Action from Mexican Institute of Industrial Property (IMPI) for MX Application No. MX/a/2013/014038 (with English translation), Feb. 27, 2015.
CA Office Action for Canadian Patent Application No. 2,836,588 from Canadian Intellectual Property Office, Jul. 9, 2015.
Notice of Allowance for U.S. Appl. No. 13/944,660, Jun. 26, 2015.
Response to Non-Final Office Action for U.S. Appl. No. 13/944,660, Apr. 13, 2015.
JP Office Action Notification of Reason for Rejection for JP Patent Application No. 2015-142230 from Japan Patent Office (with English translation), Aug. 4, 2015.

* cited by examiner

USING A WIRELESS RADIO TO MANAGE POWER CONSUMPTION

RELATED APPLICATIONS

This application is a continuation-in-part claiming priority under 35 U.S.C. §120 to U.S. patent application Ser. No. 13/118,693, filed 31 May 2011, which is hereby incorporated herein by reference in its entirety. This application is also related to co-pending U.S. patent application Ser. No. 13/118,700, entitled "Dual Mode Wireless Communications Device," filed 31 May 2011, which is incorporated herein by reference in its entirety.

BACKGROUND

Current communication devices such as mobile phones and Bluetooth headsets require battery power to operate. Users must frequently recharge the batteries in order to operate the devices. Radio frequency identification (RFID) technology enables wireless RFID tags to send simple identification data without a battery using backscatter communication techniques. An RFID reader supplies power and communicates with the RFID tags through the use of radio frequency (RF) waves. RFID tags transfer a small amount of data to the RFID reader to communicate the tag's identification. Some devices may require duty cycling of operation in order to achieve long battery life from background tasks that download content, such as those mentioned above. This duty cycle is low, preserving battery life to levels that allow operation throughout a day when a specific maximum volume of data is not exceeded. However, the duty cycle operation may come at the expense of latency.

SUMMARY OF PARTICULAR EMBODIMENTS

Particular embodiments of a wireless communication system comprise a wireless device and a base station having at least one network connection and an RF transceiver. The base station may be configured to generate an RF signal and communicate with the wireless device using backscatter communication. The wireless device may be configured to generate operating power for the wireless device from the RF signal and to receive data transmitted using the RF signal and communicate data to the base station using backscatter communication.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF PARTICULAR EMBODIMENTS

Figure 1:
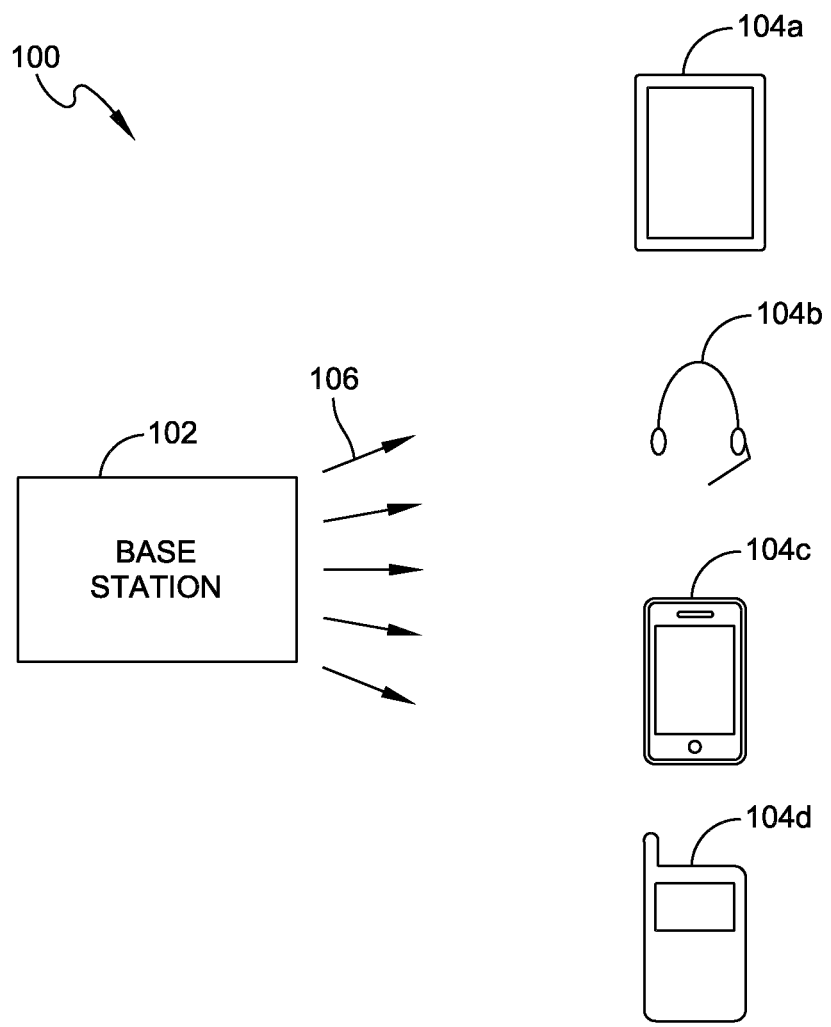
FIG. 1 is a diagram of a base station and multiple wireless communication devices in accordance with aspects of the present invention.

According to one aspect, a wireless communication device that operates without batteries is provided. According to another aspect, a wireless communication device that can perform some communication functions without drawing power from the battery is provided. According to another aspect, a wireless communication device that can perform some communication functions using minimal amounts of battery power, and significantly less battery power than current communication devices, is provided.

According to one embodiment, a wireless device includes an RF interface configured to receive an RF signal and configured to provide an output data signal derived from the RF signal, logic circuitry configured to receive the output data signal and provide an output analog signal, and power circuitry coupled to the RF interface and configured to provide DC operating power derived from the RF signal to the RF interface and the logic circuitry. The wireless device includes a first impedance matching transformer having an input coupled to the logic circuitry and having an output, and a first transducer coupled to the output of the first impedance matching transformer and configured to produce an audio signal based on the output analog signal.

According to one embodiment, the wireless device may include a second transducer configured to receive an input audio signal and provide an input analog signal to the logic circuitry. The logic circuitry may be configured to receive the input analog signal and provide an input data signal based on the input analog signal to the RF interface. The RF interface may be configured to receive the input data signal and modulate the RF signal based on the input data signal. According to one embodiment, the wireless device may also include a second impedance matching transformer coupled between the second transducer and the logic circuitry. According to another embodiment, the first impedance matching transformer may include multiple switches, which may be configurable to adjust a turns ratio of the first impedance matching transformer. According to another embodiment, the logic circuitry may include a digital to analog converter having an output coupled to the first impedance matching transformer. The logic circuitry may include an analog to digital converter having an input coupled to the second transducer.

According to one embodiment, the wireless device may be configured as a wearable headset. According to another embodiment, the wireless device may include an image sensor configured to capture an image and provide data regarding the image to the logic circuitry.

In another embodiment, a wireless communication system includes a wireless device, a base station having at least one network connection and an RF transceiver configured to generate an RF signal and communicate with the wireless device using backscatter communication. The wireless device is configured to generate operating power for the wireless device from the RF signal. The wireless device is also configured to receive an audio signal and communicate data related to the audio signal to the base station using backscatter communication.

According to one embodiment, the wireless device of the wireless communication system may include logic circuitry configured to process signals within the wireless device, a first transducer configured to generate an audio output signal, and a second transducer configured to receive the input audio signal and provide an input analog signal to the logic circuitry. The logic circuitry may be configured to receive data from the RF signal and provide an output analog signal to the first transducer.

According to various embodiments, the wireless device may include a first impedance matching transformer coupled between the logic circuitry and the first transducer. The wireless device may include a second impedance matching transformer coupled between the second transducer and the logic circuitry. The logic circuitry may include a digital to analog converter having an output coupled to the first impedance matching transformer. The logic circuitry may include an analog to digital converter having an input coupled to the second transducer.

According to one embodiment, the wireless device is configured as a wearable headset. According to another embodiment, the wireless device includes an image sensor configured to capture an image and provide data regarding the image to the logic circuitry.

According to one embodiment, the wireless communication includes multiple wireless devices each having a unique address, and each configured to generate operating power from the RF signal. The base station may be configured to receive backscatter communication from each of the wireless devices. According to one embodiment, the base station may be configured to transmit data to each of the wireless devices using the RF signal.

In one embodiment, a method of operating a wireless device includes receiving an RF signal at the wireless device, generating an output data signal derived from the RF signal, converting the output data signal to an output analog signal using a first impedance matching device, deriving DC operating power for the wireless device from the RF signal, and using a first transducer of the wireless device coupled to an output of the impedance matching device to produce an output audio signal based on the output analog signal.

According to one embodiment, the method of operating a wireless device may include using a second transducer of the wireless device to receive an input audio signal, generating an input data signal based on the input audio signal, and modulating the RF signal based on the input data signal. According to another embodiment, the method may include using an image sensor of the wireless device to capture an image and provide data regarding the image to a source of the RF signal.

According to one embodiment of the method of operating a wireless device, generating an input data signal may include using a second impedance matching transformer having an input coupled to an output of the second transducer. According to another embodiment, using a first impedance matching transformer may include configuring a plurality of switches to adjust a turns ratio of the first impedance matching transformer. According to a further embodiment, converting the output data signal to an output analog signal may include using a digital to analog converter coupled to the first impedance matching transformer. According to another embodiment, generating an input data signal may include using an analog to digital converter coupled to the second transducer.

In one embodiment, a method of providing communication between a wireless device and a base station includes generating an RF signal from the base station, receiving the RF signal at the wireless device, deriving operating power for the wireless device from the RF signal, receiving an audio input signal at the wireless device, using the wireless device to modulate the RF signal based on the audio input signal to create a modulated RF signal, and receiving the modulated RF signal at the base station.

According to one embodiment of the method of providing communication between a wireless device and a base station, the wireless device may include a first transducer configured to generate an audio output signal and a second transducer configured to receive the audio input signal. The method may further include receiving data from the RF signal and providing an output signal to the first transducer based on the data received.

According to one embodiment of the method of providing communication between a wireless device and a base station, the method may include using a first impedance matching device at an input of the first transducer. In another embodiment, the method may include using a second impedance matching device at an output of the second transducer. According to another embodiment, the method may include converting the output data signal to an output analog signal using a digital to analog converter coupled to the first impedance matching transformer. In a further embodiment, the method may include using an analog to digital converter coupled to the second transducer.

According to one embodiment of the method of providing communication between a wireless device and a base station, the method may include using an image sensor of the wireless device to capture an image and providing data regarding the image to the base station. According to another embodiment, the method may include receiving text data by the wireless device and providing data related to the text data to the base station.

According to one embodiment of the method of providing communication between a wireless device and a base station, the method may include providing multiple wireless devices each having a unique address, and each configured to generate operating power from the RF signal. The method may include selecting one of the wireless devices by the base station using the unique address of the one of the wireless devices, and receiving backscatter communication from the one of the wireless devices. According to one embodiment, the method may include transmitting data from the base station to each of the wireless devices using the RF signal.

In one embodiment, a wireless communications device includes a battery configured to provide power to operate the wireless communications device in a first mode of operation, a processing section coupled to the battery and configured to operate on battery power in the first mode of operation, and an RF interface configured to receive an RF signal and generate operating power for the wireless communication device from the RF signal in a second mode of operation. The wireless communications device is configured to detect available RF power and enter the second mode of operation from the first mode of operation.

According to one embodiment, the wireless communications device may be configured to function as a cellular telephone, a tablet computer, or a notebook computer in the first mode of operation. According to another embodiment, the wireless communications device may be configured such that the processing section enters a sleep mode in the second mode of operation. The wireless device may be further configured to detect a fill state of a memory device and based on the fill state change the processing section from the sleep mode to an active mode and conduct data transfer with the memory device. The fill state may indicate that the memory is full, the memory is empty or the memory is a selected percent full or empty.

According to another embodiment, the RF interface of the wireless communications device may be configured to receive data from the RF signal in the second mode of operation and the wireless communications device may be configured to store the data in the memory device. In another embodiment, the RF interface may be configured to modulate the RF signal and provide backscatter communication with a source of the RF signal. According to another embodiment, the wireless communication device may be configured to read data from the memory and provide an output message to the source of the RF signal by modulating the RF signal. In another embodiment, the wireless communication device may be configured to read data from the memory and provide an output message to the source of the RF signal by modulating the RF signal.

In one embodiment, a method of communicating with a wireless communications device includes operating the wireless communications device in a first mode of operation using operating power supplied by a battery contained in the wireless communications device, detecting presence of an RF signal, and in response, operating the wireless communications device in a second mode of operation using operating power derived from the RF signal.

According to one embodiment, the method of communication with a wireless communications device may include, in the first mode of operation, operating the wireless communications device as a cellular telephone, a tablet computer or a notebook computer. According to another embodiment, the method may include detecting that a storage level of a memory has reached a limit, and changing a processor of the wireless communications device from an inactive state to an active state. In another embodiment, the method may include extracting data from the RF signal in the wireless communications device in the second mode of operation, and storing the data in the memory in the wireless communications device.

According to one embodiment, the method of communication with a wireless communications device may include moving data from the memory using the processor. In another embodiment, the method may include reading data from the memory and providing an output message from the wireless communications device by modulating the RF signal. According to another embodiment, the method may include modulating the RF signal by the wireless communications device to provide backscatter communication with a source of the RF signal.

According to one embodiment of the method of communication with a wireless communications device, modulating the RF signal may include modulating the RF signal with identification data of the wireless communications device. In another embodiment, the source of the RF signal may be a base station having at least one network connection, and the method may include receiving the identification data at the base station and providing the identification data to at least one remote device over the network connection. According to another embodiment, the method may include receiving at the base station from a remote device over the network connection a message for the wireless communications device, and modulating the RF signal to provide the message to the wireless communications device.

According to one embodiment of the method of communication with a wireless communications device, the source of the RF signal may be a base station having at least one network connection. The method may include receiving data from the wireless device at the base station and providing the data to a remote device over the network connection. According to another embodiment, the method may include reading data from the memory and providing an output message from the wireless communications device by modulating the RF signal.

In one embodiment, a wireless communication system includes a wireless device and a base station having at least one network connection and an RF transceiver configured to generate an RF signal and communicate with the wireless device using backscatter communication. The wireless device includes a battery configured to provide power to operate the wireless device in a first mode of operation, a processing section coupled to the battery and configured to operate on battery power in the first mode of operation, and an RF interface configured to receive the RF signal from the base station and generate operating power for the wireless device from the RF signal in a second mode of operation. The wireless device is configured to detect available RF power and enter the second mode of operation from the first mode of operation.

According to one embodiment, the wireless communication system may be configured to function as a cellular telephone, a tablet computer or a notebook computer in the first mode of operation. According to another embodiment, the wireless device may be configured such that the processing section enters a sleep mode in the second mode of operation, and the wireless device may be configured to detect a fill state of a memory device and based on the fill state change the processing section from the sleep mode to an active mode and conduct data transfer with the memory device.

According to one embodiment, the RF interface of the wireless communication system may be configured to receive data from the RF signal in the second mode of operation and the wireless device may be configured to store the data in the memory device. According to another embodiment, the RF interface may be configured to modulate the RF signal to provide data to the base station. In another embodiment, the wireless device may be configured to read data from the memory and provide an output message to the source of the RF signal by modulating the RF signal. In another embodiment, the RF interface may be configured to modulate the RF signal with identification data of the wireless device.

According to one embodiment, the base station of the wireless communication system may be configured to receive the identification data and provide the identification data to at least one remote device over the network connection. According to another embodiment, the base station may be further configured to receive from a remote device over the network connection a message for the wireless device, and modulate the RF signal to provide the message to the wireless device. In another embodiment, the base station may be configured to receive data from the wireless device at the base station and provide the data to a remote device over the network connection. According to another embodiment, the RF interface may be configured to receive data from the RF signal in the second mode of operation and the wireless device may be configured to store the data in the memory device.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least some embodiments of the invention provide low power wireless communication devices operable in some examples without the need for a battery and in other examples, wireless communication devices include a battery but have multiple modes of operation, at least some of which require no or little draw of power from the battery. The wireless communication devices in different examples include wireless headsets and handsets having a microphone and/or speakers operable with a number of different types of devices, such as cordless telephone systems, cellular or wired telephones, RF communication systems, such as walkie talkies, audio music players, remote controls, computer systems, including desktops, laptops and tablet computers. In other examples, wireless communication devices are provided that operate as cellular phones, cameras, video game controllers, smart phones, tablet computers and other devices that communicate over a wireless network to a base station that may include connections to one or more wired or wireless networks. In at least some examples, wireless devices are powered from RF signals that may or may not include input data for the wireless devices. Further, in at least some examples, wireless communications devices utilize backscatter communication techniques to communicate with a base station or other wireless devices.

FIG. 1 is a diagram of a communications system 100 in accordance with one embodiment of the invention. The communication system 100 includes a base station 102 and multiple wireless communication devices 104a, 104b, 104c and 104d. The base station 102 transmits an RF signal 106 received by the wireless communication devices.

According to one embodiment, the base station 102 is connected to a power source. The power source may be an electrical outlet. The base station 102 may also include one or more network interfaces for coupling to one or more wired or wireless networks, including, for example, a Local Area Network (LAN), a Wireless Local Area Network (WLAN), a Wide Area Network (WAN), a cellular network or a Public Switched Telephone Network (PSTN).

According to various embodiments, wireless communication devices 104a-104d may include one or more mobile phones, iPhones, headphones, headsets (including a microphone and earphone), music players, iPods, personal digital assistants, iPads, laptops, computers, or cameras.

According to one embodiment, the wireless communication devices 104a-104d convert the received RF signal to a DC voltage to power internal components of the wireless devices 104a-104d. In one example, the wireless communication devices 104a-104d do not include a battery, and the RF signal is the only source of power.

According to another embodiment, the base station 102 includes an RF transceiver and communicates with the wireless communication devices 104a-104d using a backscatter modulation technique. The transceiver transmits to the wireless communication devices 104a-104d using amplitude or phase modulation. In some embodiments, the amplitude modulation is DSB-ASK (double sideband amplitude shift keying), PRASK (phase reversal amplitude shift keying) or SSB-ASK (single sideband amplitude shift keying). The wireless communication devices 104a-104d communicate back via backscatter modulation. In different embodiments, the base station 102 may operate in accordance with one or more RFID communication standards including GS1 Generation 2.

Figure 2:
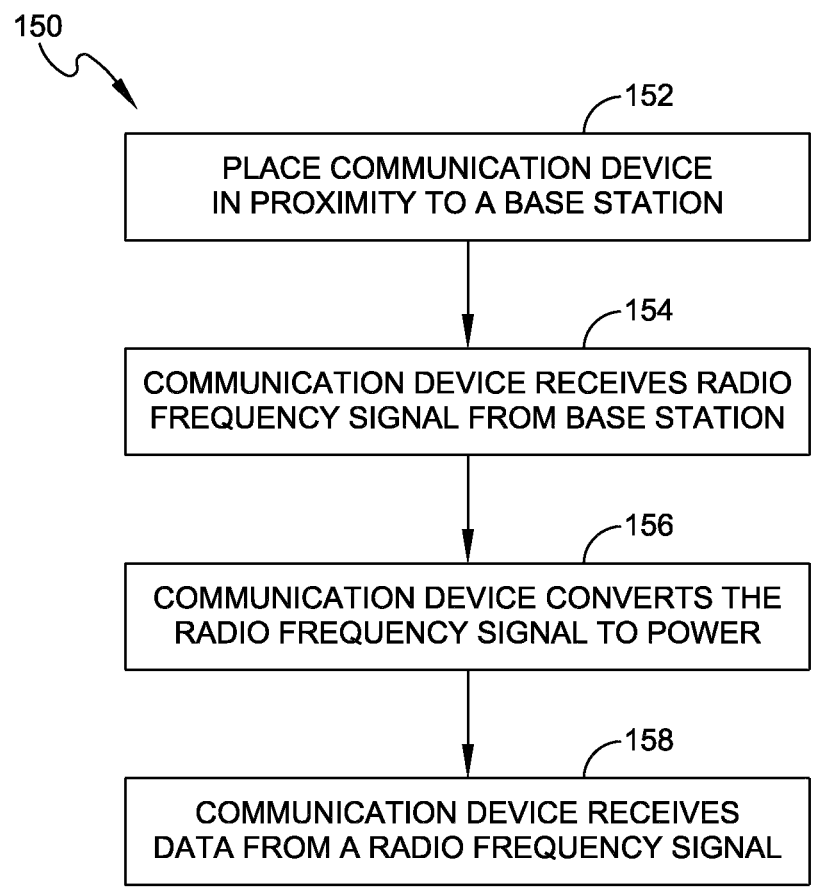
FIG. 2 is a flow chart of a method of operation of a wireless communication device in accordance with aspects of the present invention.

FIG. 2 is a flow chart of a method of operation 150 of a wireless communication device according to one embodiment. At block 152, a wireless communication device, such as wireless communication devices 104a-104d of FIG. 1, is placed in proximity to a base station. At block 154, the wireless communication device receives an RF signal from the base station. At block 156, the wireless communication device converts the RF signal to a DC voltage to power components of the wireless communication device. At block 158, the wireless communication device receives data from the RF signal from the base station.

At block 152, the wireless communication device is close enough to the base station such that the strength of the RF signal emitted by the base station is sufficient to power the wireless communication device and, depending on the functionality of the particular communication device, it can begin receiving data from or sending data to the base station. According to one example, the wireless communication device may be between about two feet and about sixty feet from the base station. In other examples, the distance between the wireless communication device and the base station is between about one inch and five feet, between about one foot and about ten feet, between about two feet and about ten feet, between about two feet and about twenty feet, between about five feet and about twenty feet, and between about five feet and about thirty feet. In other embodiments, depending on the RF communication technology used, other distances are possible.

As described above, at block 154, the wireless communication device receives an RF signal from the base station. In one example, the base station is continuously emitting an RF signal, and when the wireless communication device enters an area sufficiently proximate to the base station, it begins receiving the RF signal.

At block 156, the wireless communication device converts the RF signal to at least one DC voltage. In one embodiment, after the wireless communication device has received sufficient energy to power up, it may also begin to receive data from the RF signal, at block 158. The RF signal comprising the data may have a different source than the RF signal providing the power, or it may be transmitted from the same base station. According to one feature, the wireless communication device is operating in an area including multiple base stations, and RF signals from multiple base stations provide power to the wireless communication device. The wireless communication device may reply to the data-transmitting base station using backscatter modulation. In one embodiment, the base station emitting the RF signal that powers the wireless communication device is also the data-transmitting base station, and it includes a transmitter and a receiver that operate simultaneously with data communication occurring in one direction at a given time.

According to one embodiment, the RF signal is transmitted at a frequency between about 840 MHz and about 960 MHz. In another embodiment, the RF signal is transmitted at ISM-band frequencies, between about 2.403 GHz and about 2.483 GHz (used for WiFi). In a further embodiment, the RF signal is transmitted at five GHz U-NII band frequencies, between about 4915 MHz and about 5825 MHz (used for WiFi). According to another embodiment, the RF signal is transmitted at UMTS/LTE band frequencies, which may be about 800 MHz, about 850 MHz, about 900 MHz, about 1500 MHz, about 1700 MHz, about 1800 MHz, about 1900 MHz, or about 2100 MHz. In particular embodiments, the RF signal may be transmitted at 60 GHz (used for WiGig).

Figure 3:
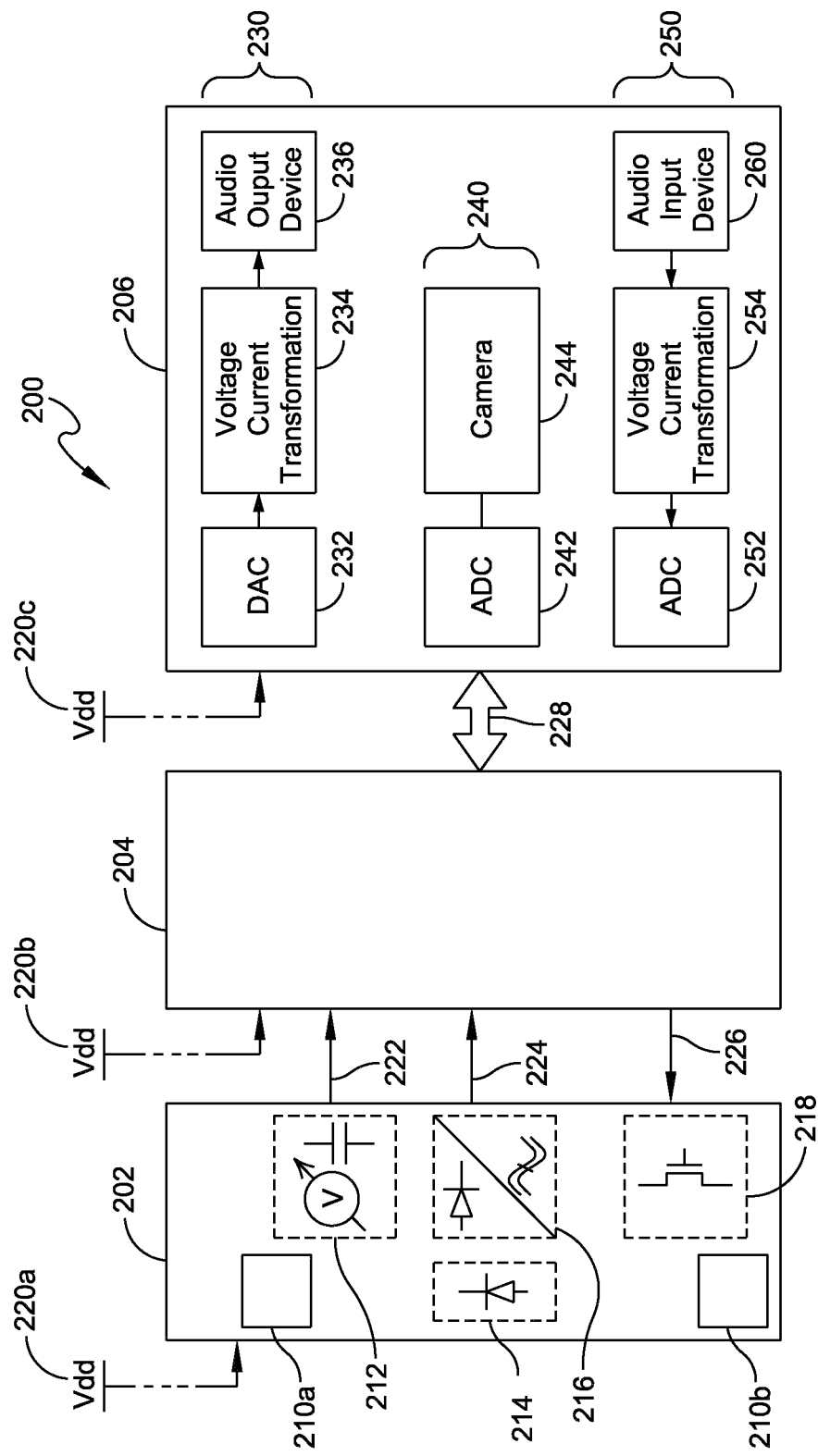
FIG. 3 is a block diagram showing several components of a wireless communication device in accordance with aspects of the present invention.

FIG. 3 is a block diagram 200 showing several components of a wireless communication device according to one embodiment of the invention. The components include an analog RF interface 202, a digital control block 204 and a sensor block 206.

The analog RF interface 202 includes antenna pads 210a and 210b, a voltage regulator 212, a rectifier 214, a demodulator 216 and a modulator 218. It may also include a voltage input 220a if an additional source of DC power, such as a battery, is included in the wireless device.

The digital control block 204 includes a voltage input 222 from the analog RF interface 202, and it may also include a voltage input 220b if an additional source of DC power, such as a battery, is included in the wireless device. In various embodiments, the digital control block 204 may include anti-collision technology, read/write control, access control, sensor interface control and a RF interface control. In one example, the digital control block 204 includes a finite state machine. In another example, the digital control block 204 includes a processor. In other embodiments, the digital control block may include a number of logic circuits and processors configured and/or programmed to perform functions described herein. According to one feature, the digital control block 204 converts a digital data packet received from the base station into an analog signal. According to another feature, the digital control block 204 converts an analog signal into a digital data packet for transmission to the base station.

The sensor block 206 includes an audio output section 230 and an audio input section 250. In other embodiments, the sensor block 206 may not include both an audio output section 230 and an audio input section 250. In other embodiments, the sensor block 206 may include one or more of a camera section 240, a video game controller section, and a texting interface. The sensor block 206 may also include a voltage input 220c if an additional source of DC power, such as a battery, is included in the wireless device.

The audio output section 230 includes a digital-to-analog converter 232, a voltage and current transformation module 234, and an audio output device 236. The audio output section is described in greater detail with respect to FIG. 4. In other embodiments, components of the audio output section 230 may be located in other functional blocks.

The audio input section 250 includes an audio input device 260, a voltage and current transformation module 254, and an analog-to-digital converter (ADC) 252. According to one embodiment, the sample-and-hold circuit 254 is integrated into the ADC 252. According to another embodiment, the audio input section 250 does not include a sample-and-hold circuit 254. The audio input section 250 is described in greater detail with respect to FIG. 6. In other embodiments, components of the audio output section 230 may be located in other functional blocks.

According to one aspect, the sensor block 206 receives digital data from the digital control block 204. For example, the sensor block 206 may receive digital audio output data from the digital control block 204. According to one embodiment, the sensor block 206 sends digital data to the digital control block 204. For example, the sensor block 206 may send digitized audio input data to the digital control block 204. In another example, the sensor block 206 sends digitized optical data such as a digital photograph to the digital control block 204.

According to one embodiment, the sensor block 206 receives digital audio output data in a compressed format and decodes it using a local state machine or processor. The digital control block 204 may receive digitized audio input and compress or encode the data using a state machine or processor. The RF protocol may have specific commands or state machine operations to allow the passing of compressed or uncompressed data. Various examples of an encoding/decoding algorithms include the LPC (Linear Predictive Coding), CELP (Code Excited Linear Prediction), SADVQ (Serial Adaptive Differential Vector Quantization), ACELP (Algebraic Code Excited Linear Prediction) and compressed sensing techniques. Other algorithms may also be used.

According to one feature, the analog RF interface 202 provides a DC voltage 222 to the digital control block 204 to power the components of the digital control block 204. According to some embodiments, the analog RF interface 202 sends data received from the base station to the digital control block 204.

According to another feature, the digital control block 204 sends data from the sensor block 206 to the analog RF interface 202. In various examples, the data may represent audio input data from a microphone 260, optical data from a camera 244 and text input from a keyboard or keypad.

According to one aspect, the analog RF interface 202, the digital control block 204 and the sensor block 206 are designed to use a minimal amount of power. For example, the digital control block 204 in one embodiment includes a finite state machine that draws minimal power. Similarly, the components of the sensor block 206 are designed to minimize power usage. A typical analog RF interface 202 and digital control block 204 uses about ten µW of power or less.

Figure 4:
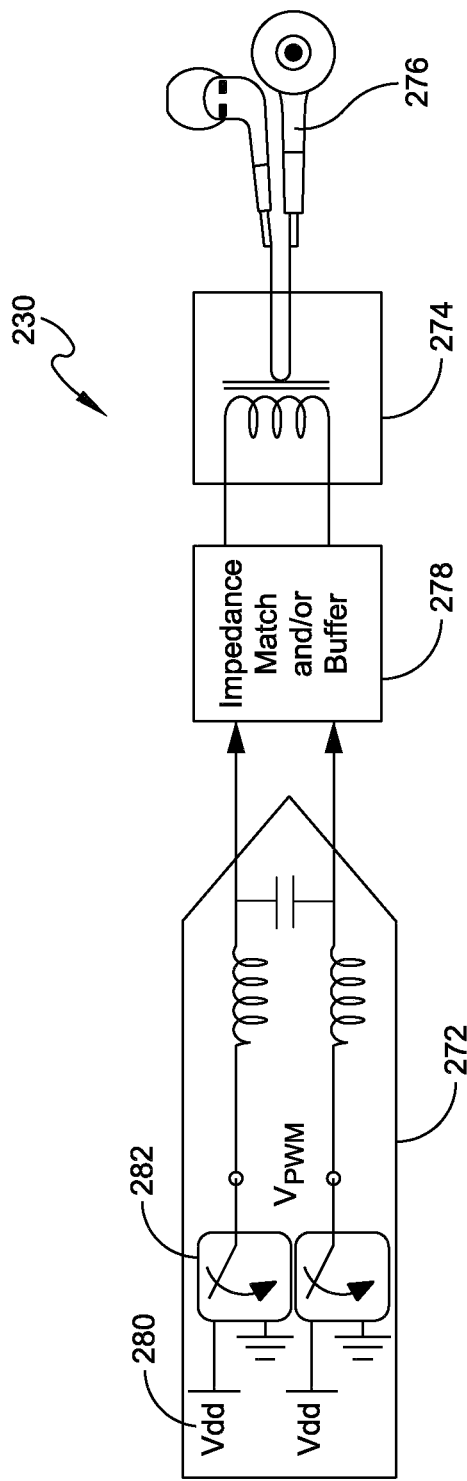
FIG. 4 is a schematic diagram of circuitry connected to earphones in accordance with aspects of the present invention.

FIG. 4 is a schematic diagram of one embodiment of the audio output section 230. The audio output section 230 includes a digital-to-analog converter (DAC) 272, an impedance matcher 278, a transformer 274 and earphones 276. The DAC 272 is connected to the impedance matcher 278 such that the output of the DAC 232 is input to the impedance matcher 278. The impedance matcher 278 is connected to the transformer 274 such that the output of the impedance matcher 278 is input to the transformer 274. The DAC 272, the impedance matcher 278 and the transformer 274 are designed to consume minimal power in transmitting the audio output signal to the earphones 276 by transforming the high voltage required for complementary metal oxide semiconductors (CMOS) or sub-threshold CMOS to the low voltage requirements of a magnetically-driven earphone.

In one embodiment, the DAC 272 includes a pulse width modulator, low-pass or band-pass low-loss filter, a voltage input 280 and a digital control 282. According to one feature, the DAC 272 including a pulse width modulator has a clock frequency equal to at least about twice the Nyquist frequency. When the clock frequency is greater than about twice the Nyquist frequency, there is an oversampling factor to describe the pulses. In one example, a 8 kHz audio signal with 8-bits of timing resolution would have a sampling rate of 2.048 megasamples per second MSPS (Fs*2^N). The LC tank circuit or higher order filter would be tuned to about 8 kHz. The filter may be a low-pass or band-pass filter.

In another embodiment, the DAC 272 includes a delta-sigma modulator and a low-pass or band-pass low-loss filter. According to one feature, the DAC 272 includes a delta-sigma modulator, and the oversampling ratio is the square root of the dynamic range in bits. In one example, an 8-bit kilosamples per second (kSPS) sigma-delta DAC would use 64 kSPS1-bit samples and a first, second or third order low-pass filter tuned to about 8 kHz. In some embodiments, the delta-sigma modulator may be first-order, second-order or third-order. In one embodiment, the low-loss low-pass filter may be implemented with a single-pole inductor-capacitor pair. In another embodiment, the inductor may be one leg of the transformer.

In other examples, the DAC 272 can be another low power digital-to-analog converter. In one example, the DAC 272 has a maximum current between about 5.7 nA and about 180 nA at a maximum operating voltage of about 0.7 V. The audio power to power earphones or headphones, like headphones 276, may be defined using Equation 1.

$$P_{audio} = 1 \text{ mW} \cdot 10^{\frac{SPL_{conversation} - SPL_{headphone}}{10}} \quad (1)$$

where $P_{audio}$ is the audio power, $SPL_{conversation}$ is the sound pressure level of the conversation, and $SPL_{headphone}$ is the SPL generated from 1 mW of power. In one example, $SPL_{headphone}$ is 124 dB SPL/mW, and thus the headphones would use 1 mW to generate 94 dB SPL. The voltage of the headphones may be determined using Equation (2).

$$V_{headphone} = \sqrt{P_{audio} R_{headphone}} \quad (2)$$

where $V_{headphone}$ is the maximum voltage of the headphones and $R_{headphone}$ is the resistance of the headphones. The turns ratio for the transformer 234, in one embodiment, may be determined using Equation (3).

$$N_{turns} = \frac{D2AV_{max}}{V_{headphone}} \quad (3)$$

where $N_{turns}$ is the ratio of the number of turns of the primary coil of the inductor to the number of turns in the secondary coil of the inductor, and $D2AV_{max}$ is the maximum voltage of the DAC 272. The current at the DAC 272, in one embodiment, may be determined using Equation (4).

$$D2AI_{max} = \frac{V_{headphone}}{R_{headphone} N_{turns}} \quad (4)$$

where $D2AI_{max}$ is the current of the DAC 272. Note that these equations assume the transformer is 100% efficient. In other embodiments, $D2AV_{max}$ and $D2AI_{max}$ may be higher than would be calculated from these equations.

According to another example, the DAC 272 includes a buck converter or a step-down DC-to-DC converter using pulse-width modulation. In this example, energy is stored in an inductor, allowing the majority of the energy from the source digital electronics to be transferred to the audio generating earphones 236, increasing the efficiency of the system.

According to one implementation, the DAC 272 includes an additional capacitor, which is charged to a selected level and then discharged into a comparator. The comparator determines the timing of the voltage pulses and permits a higher pulse width modulation switching frequency. In one example, the DAC 272 uses sigma-delta modulation with a switching frequency of 8 kHz and an oversampling ratio of 32. In another example, the DAC uses sigma-delta modulation with a switching frequency of 256 kHz at one-bit.

The transformer 274 is an impedance transformer. The impedance transformer 274 converts the analog signal received from the DAC 272 to a lower voltage, higher current signal. In various examples, the transformer 274 has a turns ratio of about 410:1, about 840:1, or between about 410:1 and about 840:1. The specific design of the transformer 274 is selected based on characteristics of the earphones and provides an output impedance matched with the input impedance of the earphones.

One embodiment of the transformer 274 is an off-the shelf, miniaturized transformer with a ferrite magnetic core. According to one feature, a miniaturized transformer with a ferrite magnetic core is highly efficient. In another embodiment, the transformer 274 is fabricated using semiconductor fabrication techniques with a planar magnetic material on the substrate and an etched multi-layer coil providing a large number of turns on the DAC side. The number of turns on the DAC side may be, for example, about 400, about 500, about 600, about 700, about 800, about 850, or about 900. A multi-layer coil on the other side provides a smaller number of turns (for example, one, two or more) on the electrical-to-sound pressure device (earphone).

In one embodiment of the semiconductor transformer 274, there are multiple arms feeding the transformer 274, each with a CMOS switch. The CMOS switch may be used to switch in a selected number of turns on the DAC side. According to one feature, the CMOS switch may be used to maximize efficiency to the fixed impedance of the earphones. In one embodiment, the turns ratio could be determined upon power-up and the switch configuration is stored in non-volatile memory. In another embodiment, the switch configuration is pre-configured.

According to some embodiments, the earphones 276 may include earphones or other electrical-to-audio transducers, including headphones, a speaker, or another audio output device. The power requirements for earphones generally vary between about 5 nW and about 300 nW for human conversation levels at 1 meter. For example, Ultimate Ears 7 Pro earphones use about 8 nW of power, Klipsch X5 earphones use about 32 nW of power, and Apple in-ear earphones use about 260 nW of power. These calculations are based on the power requirements to generate adequate sound pressure levels. Pressure is related to impedance and velocity:

$$p = Zv \quad (5)$$

where p is the pressure change from standard air pressure at 20° C., Z is the characteristic impedance of air at standard temperature and pressure and v is the root mean squared velocity of the particles in the air medium Velocity v is related to the pressure p and the sound intensity J in $W/m^2$:

$$v = J/pv \quad (6)$$

and therefore:

$$J = p^2/ZJ \quad (7)$$

Normal conversation at about one meter distance has a sound pressure level between about 40 dB and about 60 dB SPL. If the sound has to travel through an ear canal with an aperture of 0.7×0.7 cm², then earphones would use about 480 pW to produce a sound pressure level of 70 dB (at least ten times normal conversation sound pressure level at a one meter distance). In one example, Ultimate Ears 7 Pro (UE7 Pro) headphones have a sensitivity of 124 dBSPL per mW of input power and an impedance of 17.5Ω at 1 kHz. Thus, these headphones use 4.0 nW of power to operate per channel and produce a voltage of 260 μV rms. Furthermore, according to equations (1)-(4), for Ultimate Ears 7 Pro headphones, the primary winding of the transformer would have 2652 turns and the 0.7V DAC 272 would have a maximum current of 5.68 nA. In another example, the Apple in-ear headphones, such model MA850G/B have a sensitivity of 109 dBSPL/mW and an impedance of 23Ω at 1 kHz. Thus, these headphones use 130 nW per channel and produce a voltage of 1.70 mV rms. Furthermore, according to equations (1)-(4), for the Apple in-ear headphones, the primary winding of the transformer would have 411 turns, and the 0.7V DAC 272 would have a maximum current of 180 nA.

Figure 5:
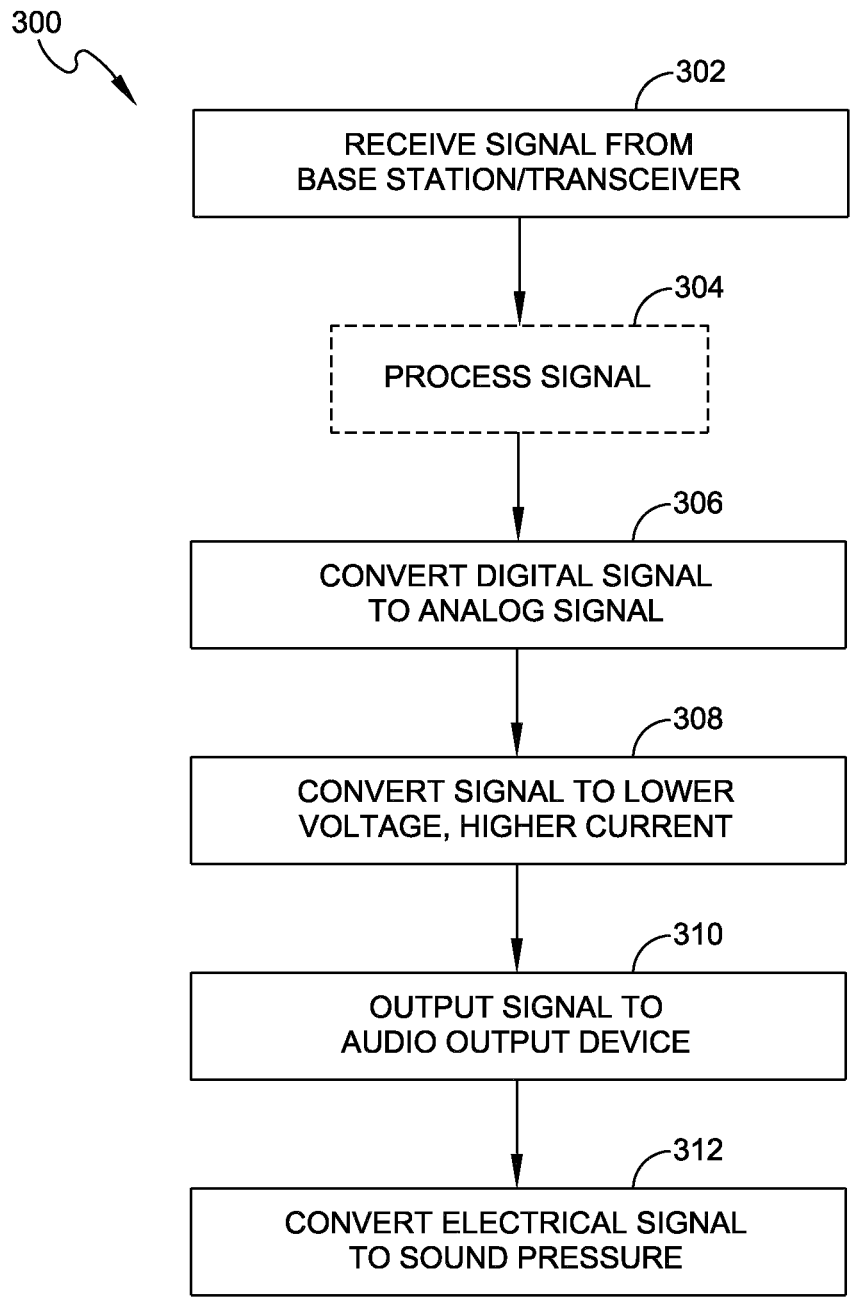
FIG. 5 is a flow chart of a method of powering an audio output device in accordance with aspects of the present invention.

FIG. 5 is a flow chart of a method of powering an audio output device, according to an embodiment of the invention. In one example, the audio output device is the earphones 276 of FIG. 4. In block 302, the analog RF interface of a wireless communication device receives an RF signal from a base station. The analog RF interface may be the interface 202 of FIG. 3. The analog RF interface demodulates the RF signal to produce an input data signal, and sends the input data signal to the digital control block 204. At block 304, the digital control block optionally processes the signal, for example by decoding the data from a compressed representation. At block 306, a digital-to-analog converter converts the digital signal to an analog signal. The digital-to-analog converter may be the DAC 272 described with respect to FIG. 4. According to one embodiment, the analog signal has a dynamic voltage range that varies from about zero volts up to a CMOS logic or sub-threshold logic level. In various embodiments, the voltage may be about 0.7 V, about 1.8 V, or between about 0.7 V and about 1.8 V. At block 308, a transformer converts the analog signal to a lower voltage analog signal having a higher current. According to one feature, the transformer converts the signal with minimal power loss. Power loss is typically 10-20 percent for conventional, large transformers, making them eighty to ninety percent efficient. According to various examples, the transformer is about ninety-nine percent efficient, about ninety-five percent efficient, about ninety percent efficient, about eighty percent efficient, or between about ninety and about ninety-nine percent efficient. The transformer may be the transformer 274 described with respect to FIG. 4. At block 310, the low voltage analog signal is output to an audio output device. At block 312, the output electrical signal is converted to sound pressure.

In one embodiment, the received signal provides power to the wireless communication device and includes data. In another embodiment, the received signal is a packet designed specifically for transmitting audio data over the channel. In another embodiment, the received signal provides power to the wireless communication device, and a different signal provides the data.

Figure 6:
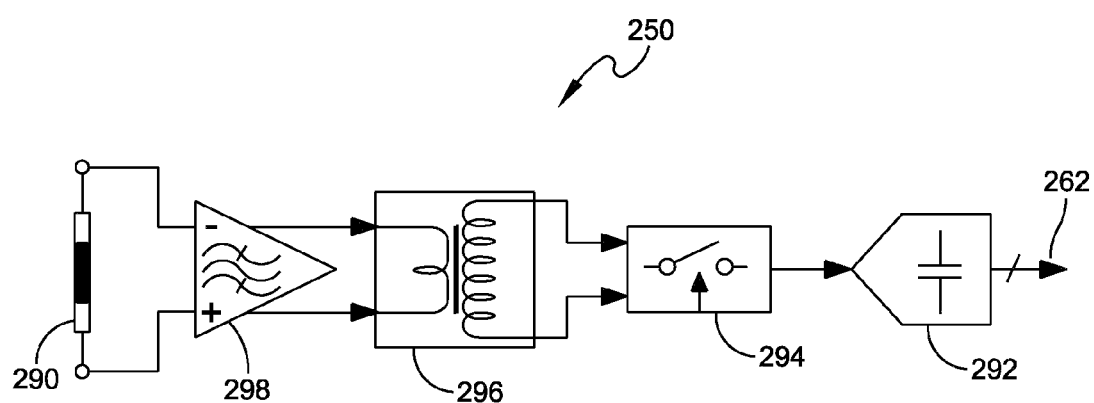
FIG. 6 is a schematic diagram of circuitry connected to a microphone in accordance with aspects of the present invention.
Figure 8A:
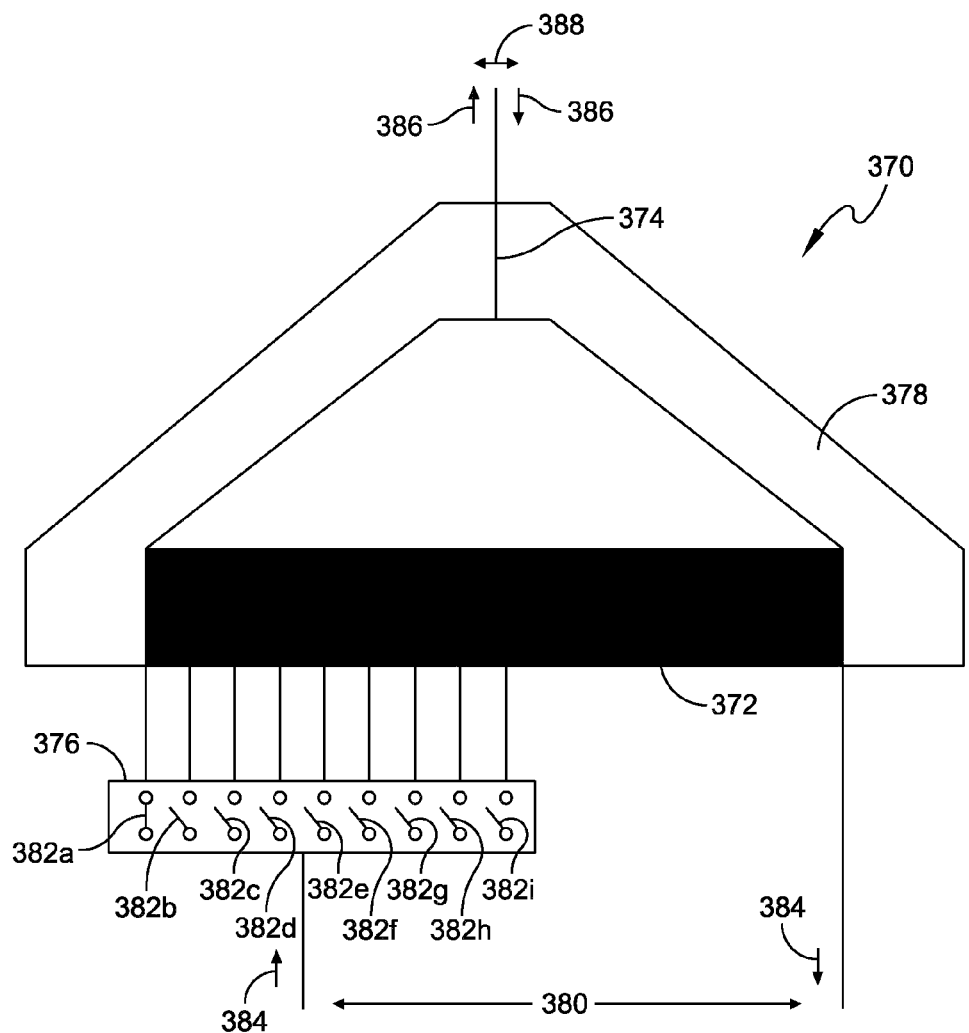
FIG. 8A is a schematic diagram of a top view of a transformer in accordance with aspects of the present invention.

FIG. 6 is a schematic diagram of the audio input section 250 and includes a microphone 290, a buffer 298, a transformer 296, a sample-and-hold circuit 294, and an analog-to-digital converter (ADC) 292, according to an embodiment of the invention. According to one embodiment, the audio input section 250 may also include a variable gain amplifier, for example connected to the buffer 298 and the transformer 296. According to one embodiment, the sample-and-hold circuit 294 is part of the ADC 292, and in another embodiment, the audio input section 250 does not include a sample-and-hold circuit 294. In another embodiment, the buffer 298 may be a low-noise amplifier. In one example, the transformer 296 is an impedance transformer and amplifies the voltage by decreasing the current. In another embodiment, the audio output section 250 does not include a buffer 298, and the buffer 298 functions are implemented in the transformer 296. In one example, the transformer is a semiconductor transformer, such as the transformer 370 shown in FIG. 8A or the transformer 390 shown in FIGS. 8B and 8C. In one embodiment, the transformer is the transformer 274 used in the audio output section 230. In one example, a single transformer, such as the transformer 370 shown in FIG. 8A, is used for both the audio output device 230 and the audio input device 250, and one or more switches can be used to repeatedly adjust the turns ratio of the transformer as appropriate for each device.

The analog-to-digital converter 292 has an output signal 262. The microphone 290, buffer 298, variable gain amplifier 296, sample-and-hold circuit 294 and analog-to-digital converter 292 are elements of a wireless communication device and are designed to consume minimal power in transmitting the audio input signal from the microphone 290 to the digital control block of the wireless communication device.

The microphone 290 includes an audio transducer that converts sound pressure differences into electrical energy. In one example, the microphone 290 is an electret microphone, and it may be an electret MEMS microphone. In another example, the microphone 290 is a dynamic microphone. According to one feature, the microphone 290 operates with a zero Volt bias. The power usage of the microphone may be between about 10 pW and about 200 pW, and may be calculated using Equations 8-11. In particular, the power in a pressure field may be defined using Equation 8.

$$P = Ap^2/Z \qquad (8)$$

where p is the pressure, Z is the acoustic impedance of air, and A is the area of the aperture of the microphone. The acoustic impedance of air Z may be defined using Equation 9.

$$Z = \rho \cdot c \qquad (9)$$

where ρ is the density of the medium (here, air), and c is the speed of sound. According to one example, for air at a temperature of 20° C., the density of air is 1.184 kg/m³, the speed of sound is 346.1 m/s, and the impedance Z is about 409.8 Pa s/m. Note that 60 dB SPL is $2.0 \cdot 10^{-3}$ Pascal at a distance ($r_1$) of 1 m. In one example, the distance between the microphone and the mouth ($r_2$) is only about ⅓ meter, so the SPL of the transmitted signal is greater. In particular, the pressure is increased by the ratio $r_1/r_2$. The Power may also be defined for the capacitive sensor using equation 10.

$$P = \frac{1}{2}CV^2 f \qquad (10)$$

where C is capacitance, V is voltage, and f is frequency. Equation 10 may be used calculate a voltage to pressure ratio, assuming all the sound power that enters the aperture is converted to electrical energy as shown in Equation 11.

$$\frac{dV}{dp} = \sqrt{\frac{2A}{ZCf}} \qquad (11)$$

According to one example, the microphone is a Caltech MEMS microphone, as described by T. Y. Hsu, W. H. Hsieh, Y.-C. Tai and K. Furutani in "A Thin Film Teflon Electret Technology for Microphone Applications," A Solid State Sensor, Actuator and Microsystems Workshop, Hilton Head, 1996, pp. 235-238 (http://www.audiocircuit.com/A-PDF/AA-Materials-MAT/Membranes-ME/941-DUP-Teflon-elect-A-A01.pdf). The area A of the aperture of the microphone is $12 \times 10^{-6}$ m$^2$ (3.5 mm per side). Using equations 8-11, if the input frequency f is 250 Hz, the microphone is estimated to use about 13 pW of power.

In another example, the microphone is a Brüel and Kær 4953 electret microphone. The area A of the aperture of the microphone is $127 \times 10^{-6}$ m$^2$ (½" diameter). Using equations 8-11, if the input frequency f is 250 Hz, the microphone is estimated to use about 140 pW of power.

According to one embodiment, the peak voltages produced by the microphone are between about 900 µV and about 1.0 mV.

The signal from the microphone 290 is sent to the low noise amplifier 298. The low noise amplifier 298 amplifies the signal and transmits it to the transformer 296. According to one embodiment, the buffer 298 is a low-noise transimpedance amplifier operating complementary metal-oxide semiconductor (CMOS) voltage levels. The CMOS voltage levels may be about 0.7 V, about 1.8 V, or between about 0.7 V and about 1.8 V.

In one embodiment, a variable gain amplifier may be used to amplify the amplitude of the signal, and output it to an analog-to-digital converter 292. In one embodiment, the analog-to-digital converter is the sample-and-hold circuit 294, followed by an integrating ADC 292. In another embodiment, the analog-to-digital converter 292 may be a pulse-density converter, such as a sigma-delta analog-to-digital converter. In another embodiment, the analog-to-digital converter 292 may be a delta-encoded ADC. In another embodiment, the analog-to-digital converter 292 is a success-approximation ADC. The sample-and-hold circuit 294 samples the voltage of the signal and holds it at a constant level for a period of time. The period of time may be between about 100 µs and about 100 µs, and it may be about 100 µs, about 250 µs, about 500 µs, about 750 µs, about 1 µs, about 10 µs, about 25 µs, about 50 µs, about 75 µs or about 100 µs. The sample-and-hold circuit 294 outputs the signal to the ADC 292.

According to one example, the buffer 298, transformer 296 and analog to digital converter 292 use about 247 nanowatts of power, based on an 11 fJ/step metric. According to other examples, the buffer 298 and a variable gain amplifier use about 337 nW of power or about 584 nW of power. In other examples, the power usage of the buffer 298 and a variable gain amplifier is about 200 nW, about 250 nW, about 300 nW, about 350 nW, about 400 nW, about 450 nW, about 500 nW, about 550 nW, about 600 nW, about 750 nW or about 1000 nW.

According to one embodiment, the signal input to the ADC 292 has a voltage between about 90 µV and about 1.0 mV, and the front-end gain of the ADC 292 is about 40 dB or greater than about 40 dB. In one embodiment, the ADC 292 uses a switch-capacitor direct-conversion binary search array. According to one feature, this minimizes power consumption by the ADC 292. In one example, the ADC 292 is a successive-approximation ADC, and it may be a 450 nW, 12-bit, 1 kS/s SAR ADC which uses about 3.6 µW of power to capture voice up to 8 kS/s. In another example, the ADC 292 is a 7.5-bit ENOB (effective number of bits) 7.75 µW design, with a signal-to-noise dynamic range of about 46.92 dB. This design may be implemented in a 0.18 µm CMOS (complementary metal oxide semiconductor), which runs at about 500 kS/s, and has a Figure of Merit (FOM) of 86 fJ/conversion step.

Figure 7:
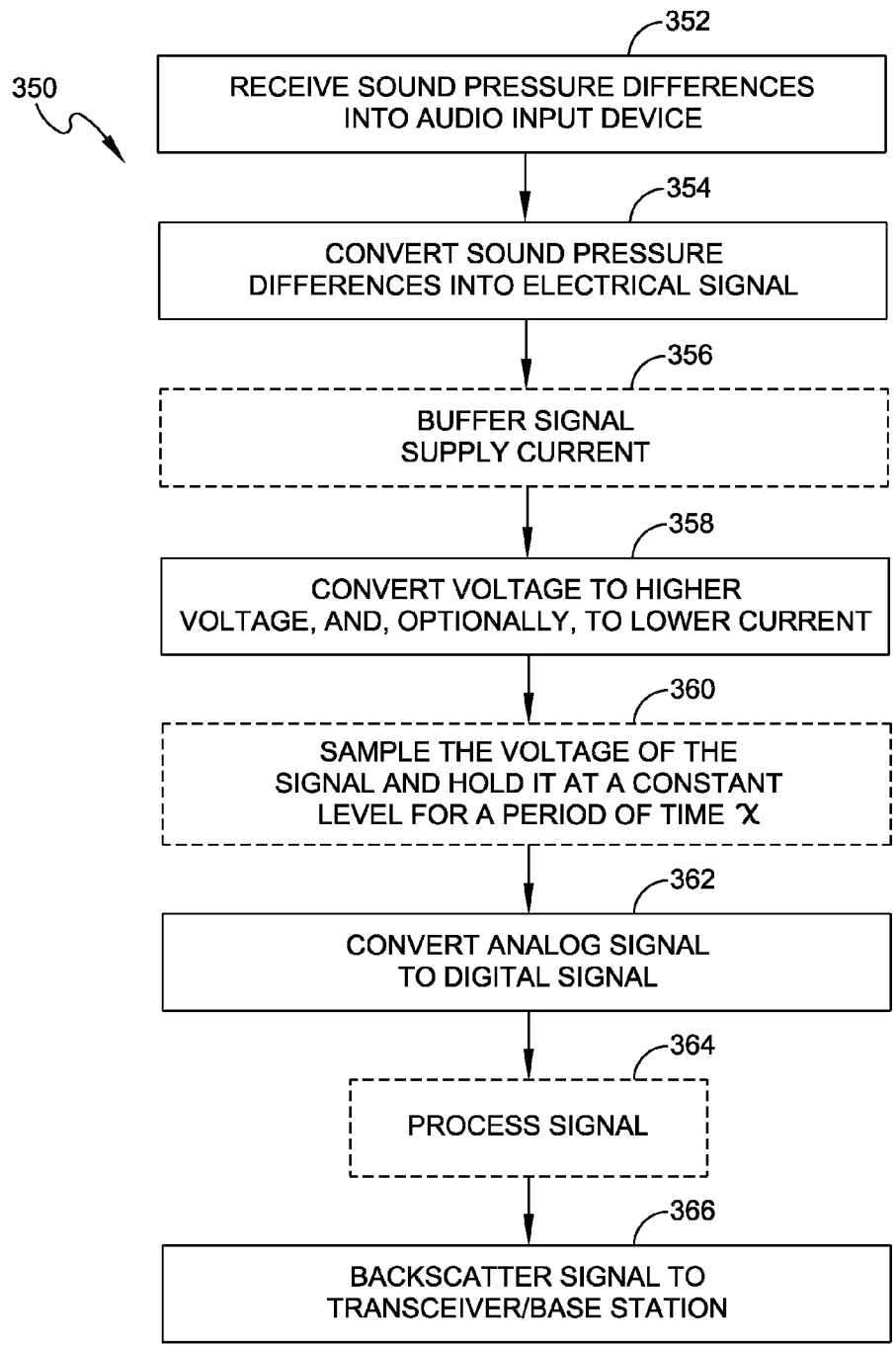
FIG. 7 is a flow chart of a method of receiving audio input in accordance with aspects of the present invention.

FIG. 7 is a flow chart of a method 350 of receiving audio input according to an embodiment of the invention. At block 352, audio input is received, for example by a microphone. The audio input may be sound pressure differences. At block 354, sound pressure differences are converted into electrical energy. Optionally, at block 356, the signal may be buffered to produce voltage and current. Optionally, at block 358, the incoming signal may be converted to a signal with a higher voltage and a lower current. In one embodiment, the amplitude of the signal may also be amplified, for example by a variable gain amplifier. According to one embodiment, an impedance-transformation circuit converts current and voltage (at block 356) and amplifies the amplitude of the voltage signal. At block 360, the voltage of the signal is optionally sampled and held for a period of time. At block 362, the analog signal is converted to a digital signal. According to one embodiment, the conversion of the analog signal to a digital signal at block 362 includes sampling the voltage of the signal and holding it for a period of time. The digital signal is output to the digital control block of a wireless communication device. Optionally, at block 364, the output signal is processed by a processor. At block 366, the output signal is sent out to a backscatter transceiver, which may be, for example, the base station or another RF receiver.

FIG. 8A is a schematic diagram of a transformer 370, including a primary winding 372, a secondary winding 374, a switch module 376, and a core 378, according to an embodiment of the invention. According to one feature, the transformer 370 is a microfabricated transformer, and the substrate for the fabrication may be silicon or another selected material suitable for microfabrication. The primary winding 372 and the secondary winding 374 are wrapped around the core 378. The primary winding 372 has a primary current 384. The primary current 384 travels through the switch module 376 and through the primary winding 372. The secondary winding 374 has a secondary current 386.

According to one feature, the current 384 passing through the primary winding 372 creates a magnetic field and a changing magnetic field induces a voltage 380 across the ends of the primary winding 372. The current 386 passing through the secondary winding 374 induces a voltage 388 across the ends of the secondary winding 374. According to one feature, the voltage 380 across the primary winding 372 is greater than the voltage 388 across the secondary winding 386.

The switch module 376 is connected to the primary winding 372, and may include one or more switches 382a-382i. The switch module 376 may be used to adjust the number of turns in the primary winding 372. In one example, when the left-most switch 382a of the switch module 376 is closed, the primary winding 372 has 840 turns. In another example, when only the right-most switch 382i is closed, the primary winding 372 has 410 turns. In typical embodiments, only one of the switches 382a-382i is closed at a time. According to one embodiment, the switch 376 is an SP9T switch.

According to one feature, the core 378 is constructed of a magnetic material. For example, the core 378 may be a ferromagnetic alloy on a silicon surface. In another example, the core 378 may be a CoZrRe alloy, such as that described by Mino et al. in "A new planar microtransformer for use in microswitching converters." Magnetics, IEEE Transactions, vol. 28(4) pp. 1969-73 (2002).

Figure 8B:
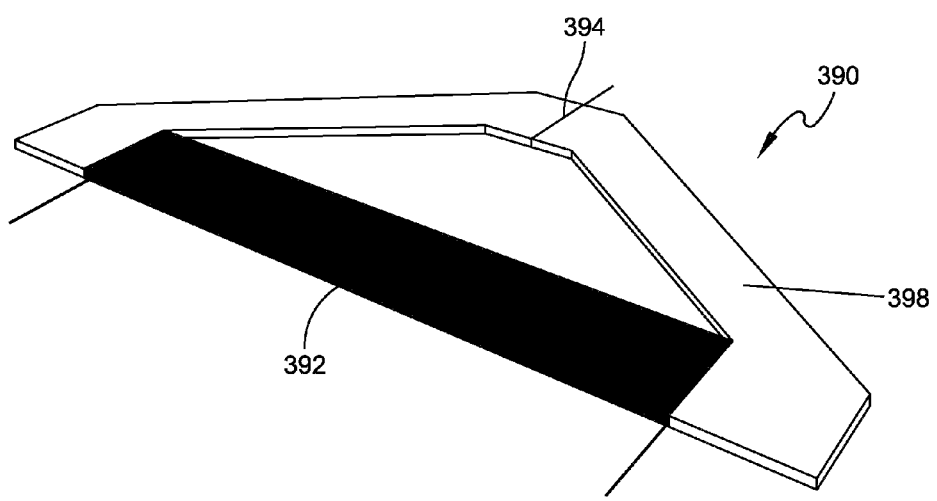
FIG. 8B is a side perspective view of a transformer in accordance with aspects of the present invention.

FIG. 8B is a side perspective view of a transformer 390 including a primary winding 392, a secondary winding 394 and a core 398, according to an embodiment of the invention.

Figure 8C:
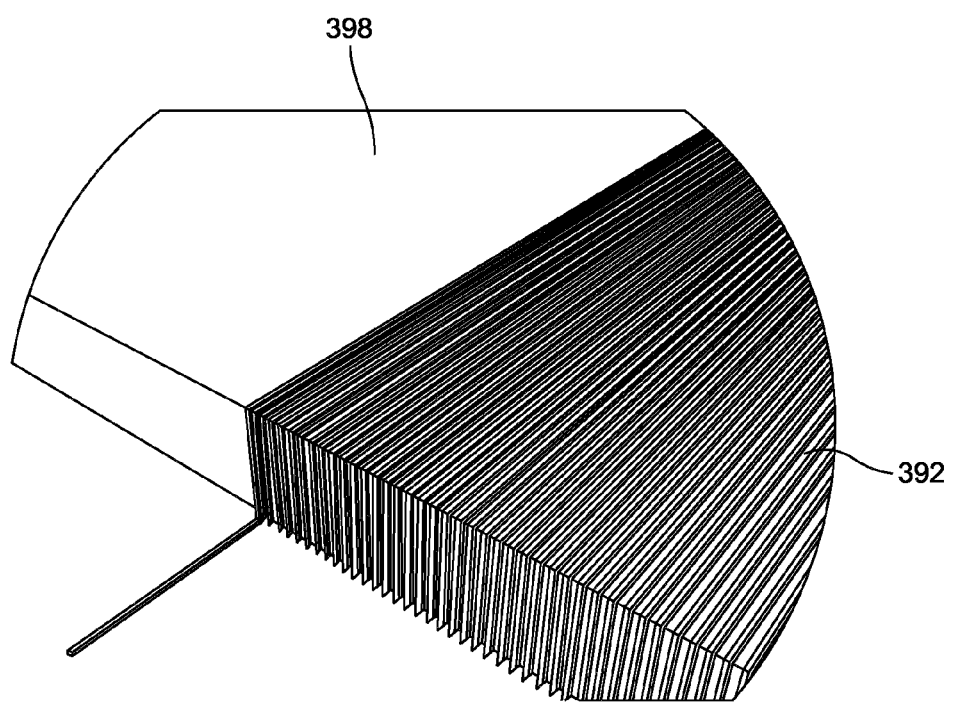
FIG. 8C is an exploded view of a transformer core and a winding in accordance with aspects of the present invention.

The primary winding 392 and the secondary winding 394 are wrapped around the core 398. FIG. 8C is an exploded view of the core 398 of the transformer 390 showing part of the primary winding 392, according to an embodiment of the invention. In one example, the primary winding 392 has 840 turns and the secondary winding 394 has one turn. In another example, the primary winding 392 has 410 turns and the secondary winding 394 has one turn. According to one feature, the core 378 is constructed on silicon and made with a ferromagnetic alloy.

Figure 9:
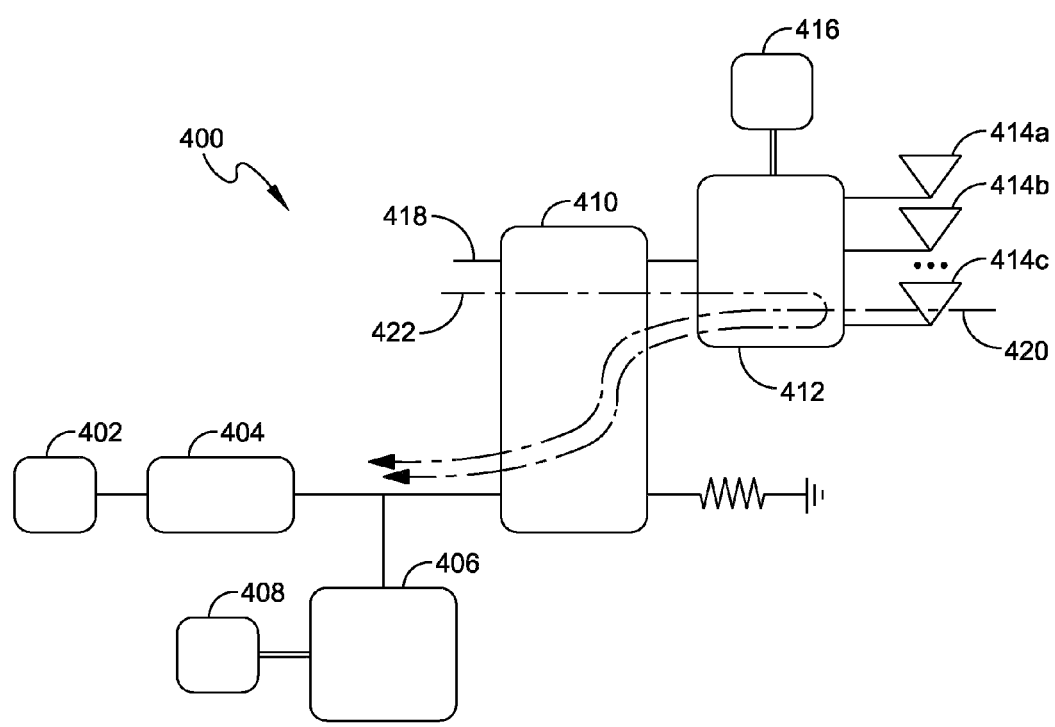
FIG. 9 is a schematic diagram of a base station showing the path of a transmitted signal to a receiver in accordance with aspects of the present invention.

FIG. 9 is a schematic diagram of a base station 400 that may be used in conjunction with the wireless communication devices discussed above. The base station 400 includes a receiver, modem and microprocessor 402, a demodulator 404, a power detector 406, a microprocessor 408, a coupler 410, a switch 412, antenna ports 414a-414c, and a digital control block 416. The diagram shows the path of a backscattered signal 420 from one or more wireless communication devices to the receiver 402. When the base station 400 is turned on, it powers wireless communication devices within its range. The power detector 406 is connected to the microprocessor 408, and monitors the RF power into the receiver level at the base station. In another embodiment, another power detector monitors the RF power level of the transmitted signal.

The coupler 410 is used to couple the transmitter and the receiver of the base station 400 to the antenna ports through the switch 412 under control of the digital control block. The coupler provides the backscatter RF signal to the receiver, which includes a demodulator 404, which demodulates the input RF signal to remove data from the signal. The transmitter includes an analog baseband signal, which may come from a digital to analog converter and low pass filter, and a modulator (I&Q mixer) that creates an AM-modulated RF signal to be directed to a wireless communication device via an antenna.

Figure 10:
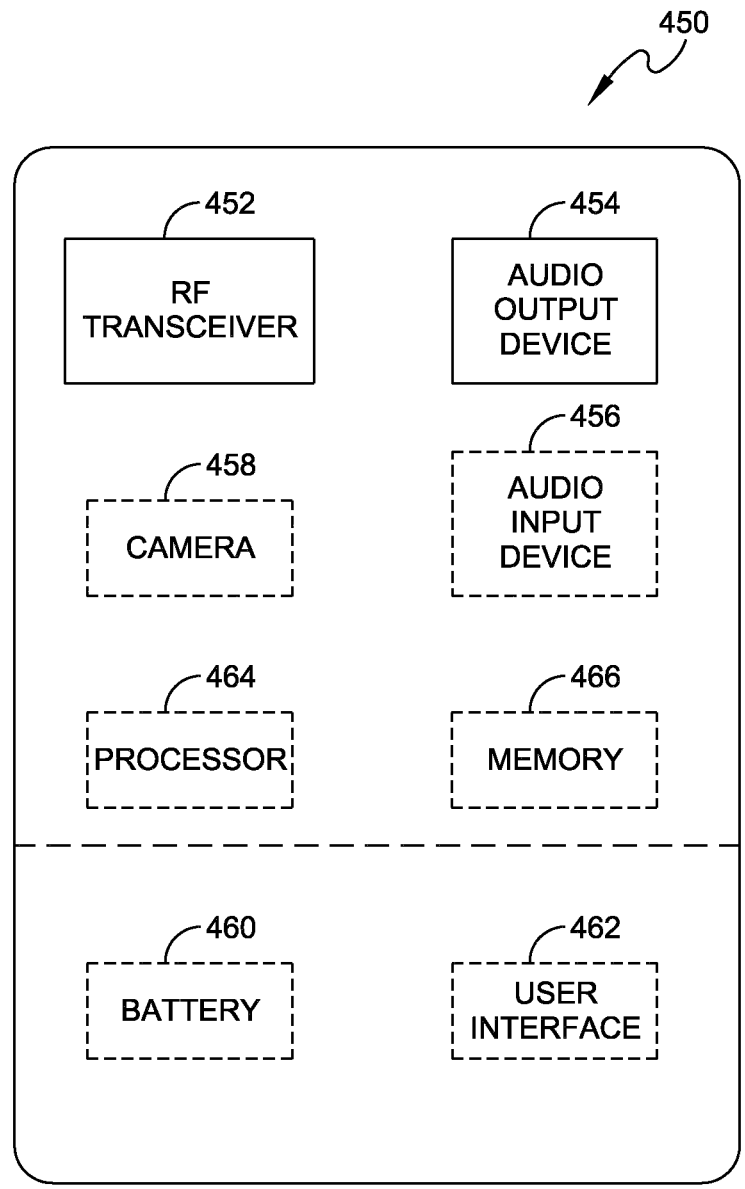
FIG. 10 is a block diagram of a wireless communication device in accordance with aspects of the present invention.

FIG. 10 is a block diagram of a wireless communication device 450 including an RF transceiver 452 and an audio output device 454, according to an embodiment of the invention. The communication device 450 may also include an audio input device 456, a camera 458, a processor 464, memory 466, a battery 460 and a user interface 462. The user interface may include a keyboard and display. The wireless communication device also includes a processing section. According to one feature, the wireless communication device 450 is passively powered by an RF signal. For example, the RF signal may passively power the RF transceiver 452 and one or more of the audio output device 454, the audio input device 456 and the camera 458.

In one embodiment, the wireless communication device 450 is a dual mode wireless communication device, such as a cellular telephone or a smart phone, and includes a battery 460. In a first mode, the wireless communication device 450 operates passively using an RF signal and does not draw DC power from the battery 460. The functionality of the wireless communication device 450 is limited in the first mode, and in one embodiment in the first mode, the dual mode wireless communications device communicates with a base station and can continue to receive messages, for example email messages, web content, text messages and phone calls without drawing power from the battery. In a second mode, the wireless communication device 450 draws power from the battery, and can perform all the functions of a typical wireless communication device of its kind.

In another embodiment, in a first mode, the wireless communication device 450 operates using an RF signal and draws minimal DC power from the battery 460. This may be considered a battery-assisted passive mode. The functionality of the wireless communication device 450 is limited in the first mode, and in one embodiment in the first mode, the dual mode wireless communications device communicates with a base station and can continue to receive messages, for example email messages, web content, text messages and phone calls without drawing power from the battery. In a second mode, the wireless communication device 450 draws power from the battery, and can perform all the functions of a typical wireless communication device of its kind.

According to one embodiment, the wireless communication device is a mobile phone, and the RF signal provides an indication to the mobile phone that it is receiving an incoming call. The receipt of the indication that the mobile phone is receiving an incoming call wakes up the mobile phone and it can receive the call.

Figure 11:
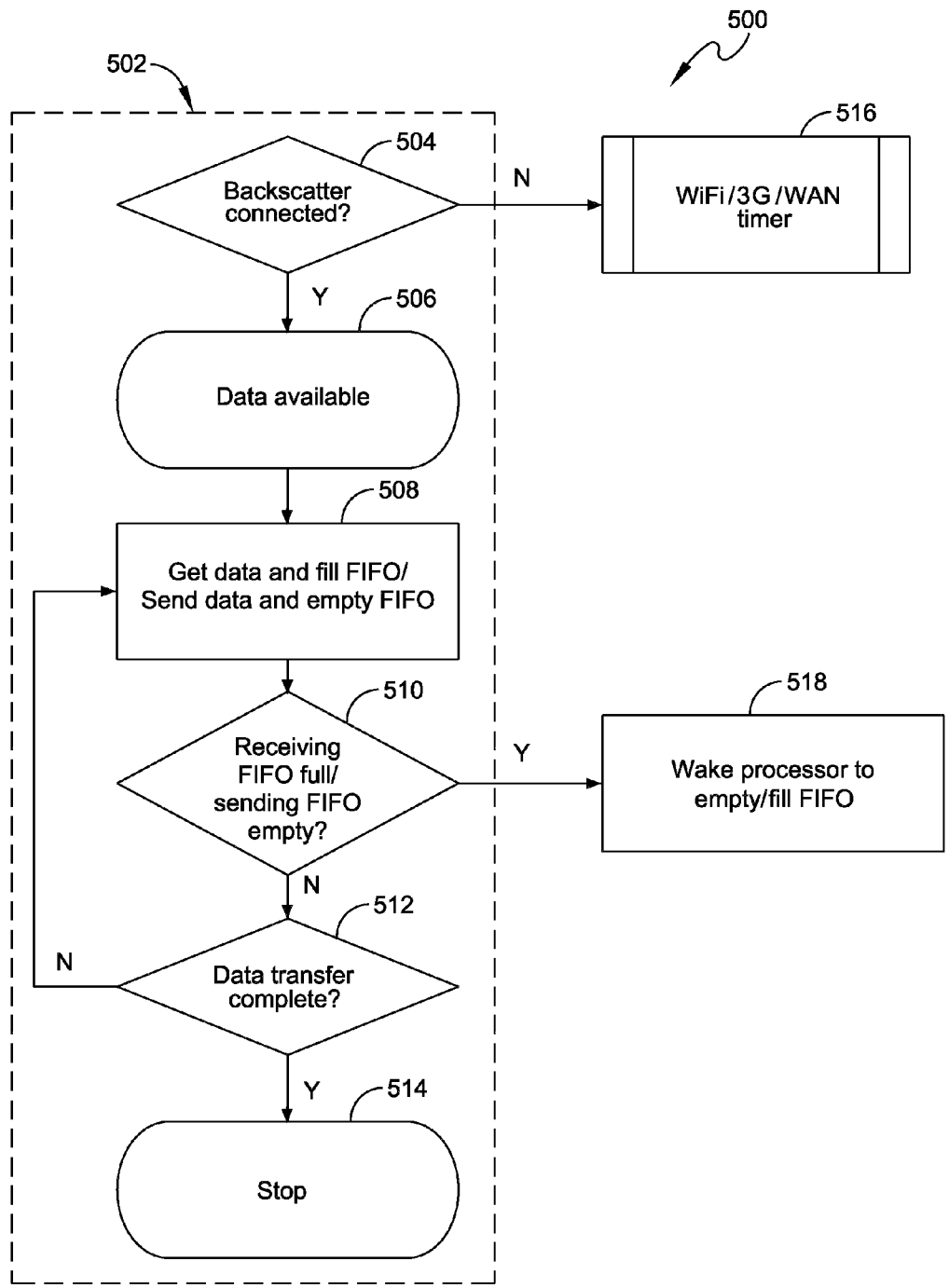
FIG. 11 is a flow chart of a method of sending and receiving data in a dual mode wireless communication device in accordance with aspects of the present invention.

FIG. 11 is a flow chart of a method 500 of sending and receiving data in a dual mode wireless communication device according to an embodiment of the invention. The method 500 includes a backscatter method 502 that can be performed without drawing power from a battery. The backscatter method 502 may also be performed using some battery power but significantly less battery power than current communication devices. At block 504, the wireless communication device determines whether there is a backscatter connection available by searching for an RF signal. If no backscatter connection is available, the wireless communication device operates in its battery-powered mode using another connection, such as a WiFi, 3G, 4G or other WLAN\WAN connection. If a backscatter connection is available, at block 506 the wireless communication device establishes a connection with the base station and determines if there is data available.

In particular embodiments disclosed herein, any type of data may be transmitted to or from the wireless communication device either without drawing any power from the battery or by only drawing significantly less battery power than current communication devices. Such data may include, by way of example and not limitation: email, text messages, multimedia messages, videochat/videoconference transmissions, alerts, notifications, calendar updates, address book/contact list updates, newsfeed stories, images, or video. In particular embodiments, the base station may transmit software updates, firmware updates, or configuration updates to the wireless communications device. In particular embodiments, the wireless communication device may transmit, by way of the base station, data to be replicated to a remote storage disk. In particular embodiments, the wireless communication device may transmit data captured by sensors of the wireless communication device to the base station. Particular embodiments described herein may provide more efficient battery consumption (relative to devices that define the current state-of-the-art) with very low latency. By way of example, the peak power consumption of a Bluetooth radio (lowest power conventional radio in many mobile devices) is 10-20 mA, whereas the battery power consumption of a backscatter RFID tag is 0-100 μA. Even if the physical layer data rate is 10 times slower than a Bluetooth radio, the power consumption of a backscatter radio is at least 10 times better than a conventional radio.

In particular embodiments, the particular types of data that are transmitted using the RF signal may be limited and/or prioritized by type, such as, by way of example and not limitation, (1) system notifications and alerts, (2) text-based data, (3) only data that does not exceed a specified size, (4) only data marked as being time-sensitive, (5) communications data marked high-priority or urgent, (6) work-related communications data versus personal communications data, or (7) paid or sponsored data, e.g., advertisements. In particular embodiments, for text-based data, transmission using the RF signal or a backscatter communication channel may be limited to an abstract (e.g., max 25-characters).

In particular embodiments, data associated with a social-networking system may be transmitted by way of the base station to and from a wireless communications device. Such transmissions may be using the RF signal or a backscatter communication channel may be limited and/or prioritized according to any relevant factors, such as, by way of example and not limitation, (1) the degree of separation between the user associated with the wireless communications device and any social-networking users associated with the content or data in the transmission, or (2) a measure of affinity of the user associated with the wireless communications device for the content or data in the transmission, or for any social graph elements associated with the content or data.

In particular embodiments, such data may be transmitted without the wireless communications device activating any visual or audio alerts that would require more operating power than can be generated from the RF signal, such as lighting up the whole screen to briefly display a listing of abstracts of recently-received communications. Instead, the wireless communications device may substitute a low-power visual and/or audio alert for which the level of operating power that can be generated from the RF signal is sufficient, e.g., lighting up just one or a few pixels, or a subset of pixels, of the screen to notify the user that data has been received. In particular embodiments, the wireless communications device may include a capacitor or a power storage system with low power leakage for storing power generated from the RF signal which may then be used to power a visual or auditory alert using either a component integrated into the device or a peripheral device that requires more power than can be obtained just using the RF signal.

The data may be available to download from a server, or to upload from the wireless communication device to a server. In various embodiments, the data may be sent by modifying a protocol, such as TCP/IP (Transmission Control Protocol/Internet Protocol) or UDP/IP (User Datagram Protocol/Internet Protocol). In another embodiment, the data is sent directly over the wireless channel as packetized data, for example, SMTP (Simple Mail Transfer Protocol), HTML (Hyper Text Markup Language), SMS (Short Message Service), IM (Instant Messaging), phone call information, or voice-mail.

At block 508, the wireless communication device receives or sends data, thereby filling or emptying a first-in first out (FIFO) queue. According to one implementation, at block 510, the wireless communication device determines if the FIFO receiving data is full. If the FIFO receiving data is full, at block 518 the wireless communication device wakes up the processor to empty the FIFO. If the FIFO receiving data is not full, at block 512 the wireless communication device determines if the data transfer is complete. If the data transfer is not complete, the method returns to block 508 and receives more data. According to one example, the amount of data in the FIFO is the fill state of the FIFO. In this example, if the FIFO is empty, the fill state indicates that the FIFO is empty, and if the FIFO is full, the fill state indicates that the FIFO is full. In one example, the fill state indicates the amount or percentage of space remaining in the FIFO.

In another implementation, at block 510, the wireless communication device determines if the FIFO sending data is empty. If the FIFO sending data is empty, at block 518 the wireless communication device wakes up the processor to fill the FIFO. If the FIFO receiving data is not empty, at block 512 the wireless communication device determines if the data transfer is complete. If the data transfer is not complete, the method returns to block 508 and sends more data. The FIFO may be used in the fully passive audio mode or it may be used for other types of data. According to one embodiment, the fully passive audio mode functions without a FIFO.

According to one feature, the method 500 preserves battery power in a dual mode wireless communication device by using the backscatter method 502 when available.

The wireless communication device can be in a sleep mode and continue to receive messages while performing the method 502 without drawing any power from the battery, greatly extending the life of the battery.

Figure 12:
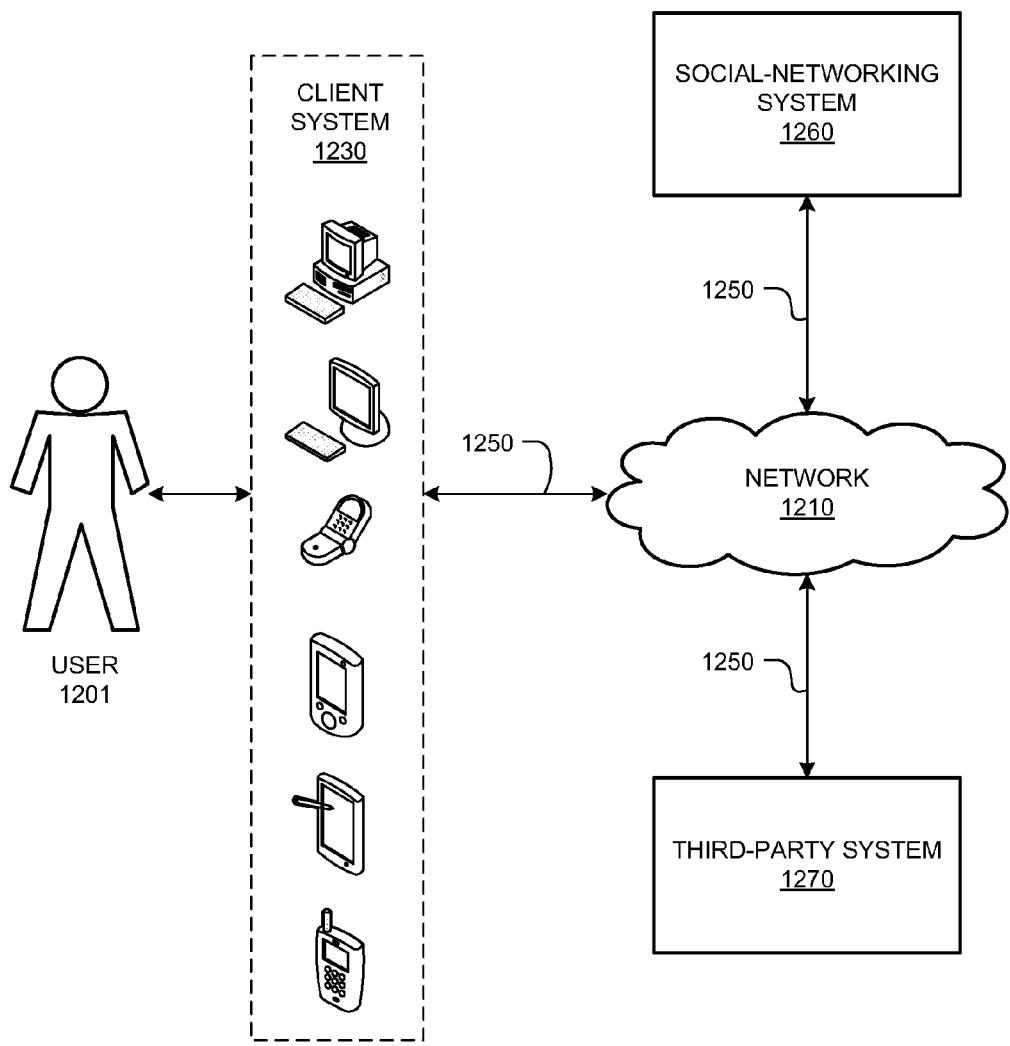
FIG. 12 illustrates an example network environment associated with a social-networking system.

FIG. 12 illustrates an example network environment 1200 associated with a social-networking system. Network environment 1200 includes a user 1201, a client system 1230, a social-networking system 1260, and a third-party system 1270 connected to each other by a network 1210. Although FIG. 12 illustrates a particular arrangement of user 1201, client system 1230, social-networking system 1260, third-party system 1270, and network 1210, this disclosure contemplates any suitable arrangement of user 1201, client system 1230, social-networking system 1260, third-party system 1270, and network 1210. As an example and not by way of limitation, two or more of client system 1230, social-networking system 1260, and third-party system 1270 may be connected to each other directly, bypassing network 1210. As another example, two or more of client system 1230, social-networking system 1260, and third-party system 1270 may be physically or logically co-located with each other in whole or in part. Moreover, although FIG. 12 illustrates a particular number of users 1201, client systems 1230, social-networking systems 1260, third-party systems 1270, and networks 1210, this disclosure contemplates any suitable number of users 1201, client systems 1230, social-networking systems 1260, third-party systems 1270, and networks 1210. As an example and not by way of limitation, network environment 1200 may include multiple users 1201, client system 1230, social-networking systems 1260, third-party systems 1270, and networks 1210.

In particular embodiments, user 1201 may be an individual (human user), an entity (e.g., an enterprise, business, or third-party application), or a group (e.g., of individuals or entities) that interacts or communicates with or over social-networking system 1260. In particular embodiments, social-networking system 1260 may be a network-addressable computing system hosting an online social network. Social-networking system 1260 may generate, store, receive, and send social-networking data, such as, for example, user-profile data, concept-profile data, social-graph information, or other suitable data related to the online social network. Social-networking system 1260 may be accessed by the other components of network environment 1200 either directly or via network 1210. In particular embodiments, social-networking system 1260 may include an authorization server (or other suitable component(s)) that allows users 1201 to opt in to or opt out of having their actions logged by social-networking system 1260 or shared with other systems (e.g., third-party systems 1270), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 1270 may be accessed by the other components of network environment 1200 either directly or via network 1210. In particular embodiments, one or more users 1201 may use one or more client systems 1230 to access, send data to, and receive data from social-networking system 1260 or third-party system 1270. Client system 1230 may access social-networking system 1260 or third-party system 1270 directly, via network 1210, or via a third-party system. As an example and not by way of limitation, client system 1230 may access third-party system 1270 via social-networking system 1260. Client system 1230 may be any suitable computing device, such as, for example, a personal computer, a laptop computer, a cellular telephone, a smartphone, or a tablet computer.

This disclosure contemplates any suitable network 1210. As an example and not by way of limitation, one or more portions of network 1210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1210 may include one or more networks 1210.

Links 1250 may connect client system 1230, social-networking system 1260, and third-party system 1270 to communication network 1210 or to each other. This disclosure contemplates any suitable links 1250. In particular embodiments, one or more links 1250 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1250 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1250, or a combination of two or more such links 1250. Links 1250 need not necessarily be the same throughout network environment 1200. One or more first links 1250 may differ in one or more respects from one or more second links 1250.

Figure 13:
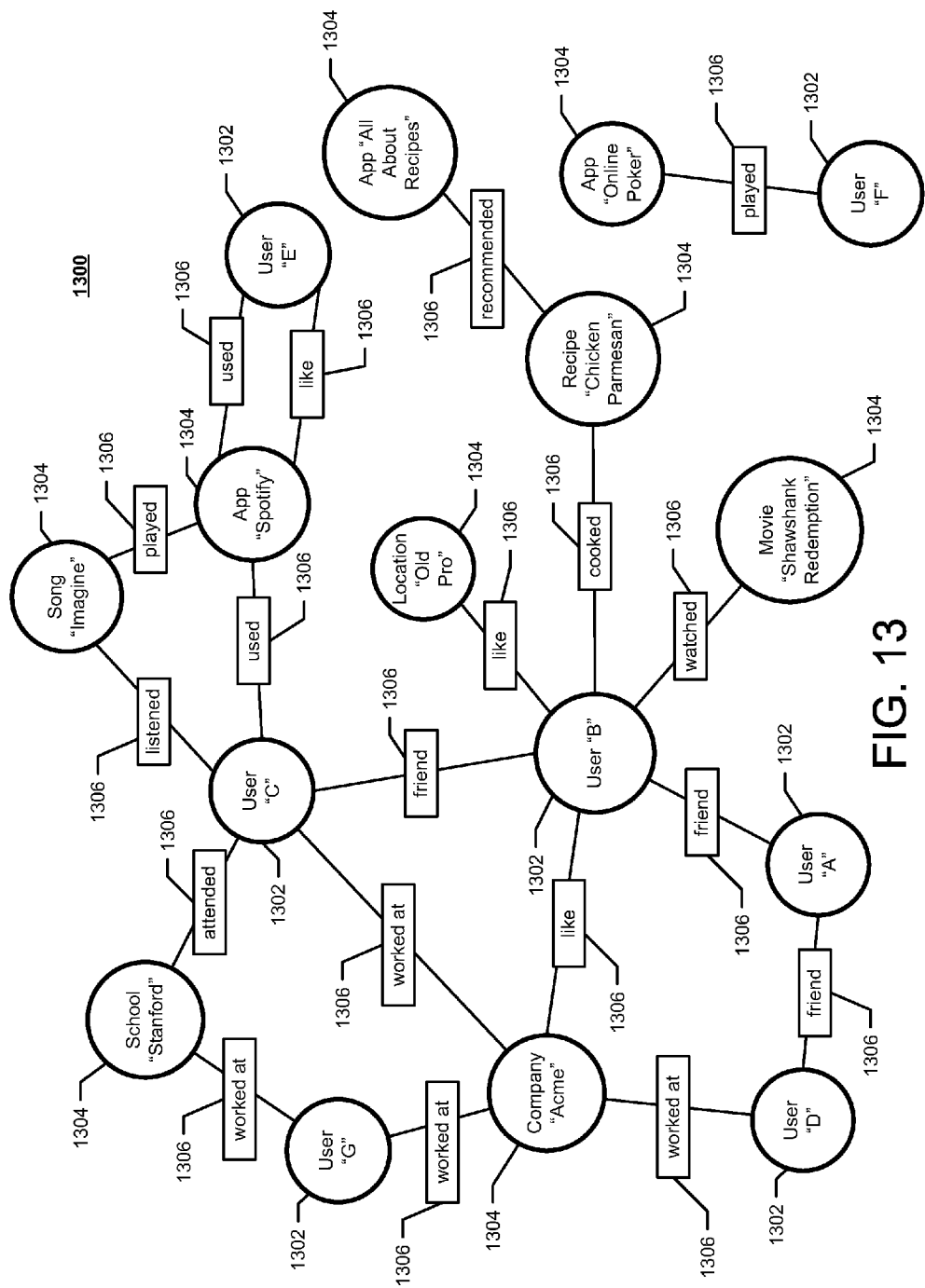
FIG. 13 illustrates an example social graph.

FIG. 13 illustrates example social graph 1300. In particular embodiments, social-networking system 1260 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, a social-networking system 1260, client system 1230, or third-party system 1270 may access social graph 1300 and related social-graph information for suitable applications. The nodes and edges of social graph 1300 may be stored as data objects, for example, in a data store (such as a social-graph database). Such a data store may include one or more searchable or queryable indexes of nodes or edges of social graph 1300.

In particular embodiments, a user node 1302 may correspond to a user of social-networking system 1260. As an example and not by way of limitation, a user may be an individual (human user), an entity (e.g., an enterprise, business, or third-party application), or a group (e.g., of individuals or entities) that interacts or communicates with or over social-networking system 1260. In particular embodiments, when a user registers for an account with social-networking system 1260, social-networking system 1260 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with social-networking system 1260. In particular embodiments, a user node 1302 may be associated with information provided by a user or information gathered by various systems, including social-networking system 1260. As an example and not by way of limitation, a user may provide his or her name, profile picture, contact information, birth date, sex, marital status, family status, employment, education background, preferences, interests, or other demographic information. In particular embodiments, a user node 1302 may be associated with one or more data objects corresponding to information associated with a user. In particular embodiments, a user node 1302 may correspond to one or more webpages.

In particular embodiments, a concept node 1304 may correspond to a concept. As an example and not by way of limitation, a concept may correspond to a place (such as, for example, a movie theater, restaurant, landmark, or city); a website (such as, for example, a website associated with social-network system 1260 or a third-party website associated with a web-application server); an entity (such as, for example, a person, business, group, sports team, or celebrity); a resource (such as, for example, an audio file, video file, digital photo, text file, structured document, or application) which may be located within social-networking system 1260 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including social-networking system 1260. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to social-networking system 1260. Profile pages may also be hosted on third-party websites associated with a third-party server 1270. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system 1270. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1230 to send to social-networking system 1260 a message indicating the user's action. In response to the message, social-networking system 1260 may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, social-networking system 1260 may send a "friend request" to the second user. If the second user confirms the "friend request," social-networking system 1260 may create an edge 1306 connecting the first user's user node 1302 to the second user's user node 1302 in social graph 1300 and store edge 1306 as social-graph information in one or more of data stores 1264. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to a edge type or subtype. A concept-profile page corresponding to a concept node 1304 may include, for example, a selectable "check in" icon (such as, for example, a clickable "check in" icon) or a selectable "add to favorites" icon. Similarly, after a user clicks these icons, social-networking system 1260 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 1260 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, social-networking system 1260 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "SPOTIFY").

In particular embodiments, social-networking system 1260 may create an edge 1306 between a user node 1302 and a concept node 1304 in social graph 1300. As an example and not by way of limitation, a user viewing a concept-profile page (such as, for example, by using a web browser or a special-purpose application hosted by the user's client system 1230) may indicate that he or she likes the concept represented by the concept node 1304 by clicking or selecting a "Like" icon, which may cause the user's client system 1230 to send to social-networking system 1260 a message indicating the user's liking of the concept associated with the concept-profile page. In response to the message, social-networking system 1260 may create an edge 1306 between user node 1302 associated with the user and concept node 1304, as illustrated by "like" edge 1306 between the user and concept node 1304. In particular embodiments, social-networking system 1260 may store an edge 1306 in one or more data stores. In particular embodiments, an edge 1306 may be automatically formed by social-networking system 1260 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 1260). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 1260 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 1260) or RSVP (e.g., through social-networking system 1260) to an event associated with the advertisement. In addition or as an alternative, an advertisement may include social-networking-system context directed to the user. As an example and not by way of limitation, an advertisement may display information about a friend of the user within social-networking system 1260 who has taken an action associated with the subject matter of the advertisement.

In particular embodiments, social-networking system 1260 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1270 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1260 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1260 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1260 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1260 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1260 may calculate a coefficient based on a user's actions. Social-networking system 1260 may monitor such actions on the online social network, on a third-party system 1270, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 1260 may calculate a coefficient based on the user's actions with particular types of content. The content may be associated with the online social network, a third-party system 1270, or another suitable system. The content may include users, profile pages, posts, news stories, headlines, instant messages, chat room conversations, emails, advertisements, pictures, video, music, other suitable objects, or any combination thereof. Social-networking system 1260 may analyze a user's actions to determine whether one or more of the actions indicate an affinity for subject matter, content, other users, and so forth. As an example and not by way of limitation, if a user may make frequently posts content related to "coffee" or variants thereof, social-networking system 1260 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1260 may calculate a coefficient based on the type of relationship between particular objects. Referencing the social graph 1300, social-networking system 1260 may analyze the number and/or type of edges 1306 connecting particular user nodes 1302 and concept nodes 1304 when calculating a coefficient. As an example and not by way of limitation, user nodes 1302 that are connected by a spouse-type edge (representing that the two users are married) may be assigned a higher coefficient than a user nodes 1302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1260 may determine that the user has a higher coefficient with respect to the first photo than the second photo because having a tagged-in-type relationship with content may be assigned a higher weight and/or rating than having a like-type relationship with content. In particular embodiments, social-networking system 1260 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1260 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1300. As an example and not by way of limitation, social-graph entities that are closer in the social graph 1300 (i.e., fewer degrees of separation) may have a higher coefficient than entities that are further apart in the social graph 1300.

In particular embodiments, social-networking system 1260 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1230 of the user). A first user may be more interested in other users or concepts that are closer to the first user. As an example and not by way of limitation, if a user is one mile from an airport and two miles from a gas station, social-networking system 1260 may determine that the user has a higher coefficient for the airport than the gas station based on the proximity of the airport to the user.

In particular embodiments, social-networking system 1260 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1260 may provide information that is relevant to user's interests and current circumstances, increasing the likelihood that they will find such information of interest. In particular embodiments, social-networking system 1260 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1260 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1260 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1270 (e.g., via an API or other communication channel), or from another suitable system. In response to the request, social-networking system 1260 may calculate the coefficient (or access the coefficient information if it has previously been calculated and stored). In particular embodiments, social-networking system 1260 may measure an affinity with respect to a particular process. Different processes (both internal and external to the online social network) may request a coefficient for a particular object or set of objects. Social-networking system 1260 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In embodiments described above, wireless communications devices communicate with a local base station. In one implementation, a facility may include a number of base stations distributed throughout the facility and a user of a wireless device may move through the facility connecting to different base stations based on the user's locations. The base stations may communicate with each other using wired or wireless technologies such as Bluetooth, WiFi, 3G and 4G, to coordinate communications with each of multiple wireless communications devices. Also, each base station may operate with more than one wireless communications device.

As discussed above, embodiments of the present invention provide significant advantages in wireless communications devices by allowing the devices to operate without battery power completely or in certain modes of operation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A wireless communication system comprising:
a wireless device associated with a user of a social-networking system, the user being represented by a user node in a social graph of the social-networking system; and
a base station comprising:
a network connection configured to receive information from the social-networking system, the information comprising a plurality of content portions; and
a radio-frequency (RF) transceiver configured to transmit data to the wireless device using an RF signal, wherein:
the data transmitted to the wireless device comprises at least one of the content portions received from the social-networking system; and
at least some of the data transmitted to the wireless device is limited or prioritized based at least in part on social-networking information associated with the user, wherein the social-networking information associated with the user comprises a plurality of affinity coefficients corresponding, respectively, to the plurality of content portions, wherein each affinity coefficient represents an affinity of the user for one of the content portions and is based at least in part on a degree of separation in the social graph between the user node and another node associated with the one of the content portions;
wherein the wireless device is configured to:
generate operating power for the wireless device from the RF signal;
receive the data transmitted by the RF transceiver using the RF signal; and
communicate other data to the base station using backscatter communication.

2. The system of claim 1, wherein the wireless device is configured to use the operating power generated from the RF signal to receive the data transmitted using the RF signal.

3. The system of claim 2, wherein the wireless device is configured to receive the data transmitted using the RF signal by relying only on the operating power generated from the RF signal.

4. The system of claim 1, wherein the wireless device is configured to generate a low-power alert.

5. The system of claim 4, wherein the low-power alert is generated by either an integrated component or a peripheral device.

6. The system of claim 1, further comprising a plurality of wireless devices each having a unique address, and each configured to generate operating power from the RF signal, and wherein the base station is configured to receive backscatter communication from each of the plurality of wireless devices.

7. The system of claim 6, wherein the base station is configured to transmit data to each of the wireless devices using the RF signal.

8. The system of claim 1, wherein the social-networking information associated with the user further comprises a degree of separation in the social graph between the user node and another user node representing another user, wherein the another user is associated with one or more of the content portions.

9. The system of claim 1, wherein the each affinity coefficient is further based on a distance between a current location of the wireless device and a location associated with the one of the content portions.

10. The system of claim 1, wherein the at least one of the content portions transmitted to the wireless device are each associated with an affinity coefficient that is above a particular threshold affinity value.

11. A method comprising:
   transmitting, by a radio-frequency (RF) transceiver of a base station, data to a wireless device using an RF signal, wherein:
      the wireless device is associated with a user of a social-networking system, the user being represented by a user node in a social graph of the social-networking system;
      the base station comprises a network connection configured to receive information from the social-networking system, the information comprising a plurality of content portions;
      the data transmitted to the wireless device comprises at least one of the content portions received from the social-networking system; and
      at least some of the data transmitted to the wireless device is limited or prioritized based at least in part on social-networking information associated with the user, wherein the social-networking information associated with the user comprises a plurality of affinity coefficients corresponding, respectively, to the plurality of content portions, wherein each affinity coefficient represents an affinity of the user for one of the content portions and is based at least in part on a degree of separation in the social graph between the user node and another node in the social graph associated with the one of the content portions; and
   receiving, by the base station, other data from the wireless device, wherein the wireless device is configured to:
      generate operating power for the wireless device from the RF signal;
      receive the data transmitted by the RF transceiver using the RF signal; and
      communicate the other data from the wireless device to the base station using backscatter communication.

12. The method of claim 11, wherein the wireless device is configured to use the operating power generated from the RF signal to receive the data transmitted using the RF signal.

13. The method of claim 12, wherein the wireless device is configured to receive the data transmitted using the RF signal by relying only on the operating power generated from the RF signal.

14. The method of claim 11, wherein the wireless device is configured to generate a low-power alert.

15. The method of claim 14, wherein the low-power alert is generated by either an integrated component or a peripheral device.

16. The method of claim 11, further comprising, receiving, by the base station, backscatter communication from each of a plurality of wireless devices, each of the wireless devices having a unique address, and each of the wireless devices configured to generate operating power from the RF signal.

17. The method of claim 16, wherein the base station is configured to transmit data to each of the wireless devices using the RF signal.

18. The method of claim 11, wherein the social-networking information associated with the user further comprises a degree of separation in the social graph between the user node and another user node representing another user, wherein the another user is associated with one or more of the content portions.

19. The method of claim 11, wherein the each affinity coefficient is further based on a distance between a current location of the wireless device and a location associated with the one of the content portions.

20. The method of claim 11, wherein the at least one of the content portions transmitted to the wireless device are each associated with an affinity coefficient that is above a particular threshold affinity value.

21. One or more computer-readable non-transitory storage media embodying software that is operable when executed to:
   transmit, by a radio-frequency (RF) transceiver of a base station, data to a wireless device using an RF signal, wherein:
      the wireless device is associated with a user of a social-networking system, the user being represented by a user node in a social graph of the social-networking system;
      the base station comprises a network connection configured to receive information from the social-networking system, the information comprising a plurality of content portions;
      the data transmitted to the wireless device comprises at least one of the content portions received from the social-networking system; and
      at least some of the data transmitted to the wireless device is limited or prioritized based at least in part on social-networking information associated with the user, wherein the social-networking information associated with the user comprises a plurality of affinity coefficients corresponding, respectively, to the plurality of content portions, wherein each affinity coefficient represents an affinity of the user for one of the content portions and is based at least in part on a degree of separation in the social graph between the user node and another node in the social graph associated with the one of the content portions; and
   receive, by the base station, other data from the wireless device, wherein the wireless device is configured to:
      generate operating power for the wireless device from the RF signal;
      receive the data transmitted by the RF transceiver using the RF signal; and
      communicate the other data from the wireless device to the base station using backscatter communication.

22. The media of claim 21, wherein the wireless device is configured to use the operating power generated from the RF signal to receive the data transmitted using the RF signal.

23. The media of claim 22, wherein the wireless device is configured to receive the data transmitted using the RF signal by relying only on the operating power generated from the RF signal.

24. The media of claim 21, wherein the software is further operable when executed to:
   receive backscatter communication from each of a plurality of wireless devices, each of the wireless devices having a unique address, and each of the wireless devices configured to generate operating power from the RF signal.

25. The media of claim 24, wherein the base station is configured to transmit data to each of the wireless devices using the RF signal.

26. The media of claim 21, wherein the wireless device is configured to generate a low-power alert.

27. The media of claim 26, wherein the low-power alert is generated by either an integrated component or a peripheral device.

28. The media of claim 21, wherein the social-networking information associated with the user further comprises a degree of separation in the social graph between the user node and another user node representing another user, wherein the another user is associated with one or more of the content portions.

29. The media of claim 21, wherein the each affinity coefficient is further based on a distance between a current location of the wireless device and a location associated with the one of the content portions.

30. The media of claim 21, wherein the at least one of the content portions transmitted to the wireless device are each associated with an affinity coefficient that is above a particular threshold affinity value.

* * * * *